US008464295B2

(12) United States Patent
Stallings et al.

(10) Patent No.: US 8,464,295 B2
(45) Date of Patent: Jun. 11, 2013

(54) INTERACTIVE SEARCH GRAPHICAL USER INTERFACE SYSTEMS AND METHODS

(75) Inventors: Heath Stallings, Grapevine, TX (US); Brian Roberts, Frisco, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 578 days.

(21) Appl. No.: 11/542,402

(22) Filed: Oct. 3, 2006

(65) Prior Publication Data

US 2010/0251162 A1 Sep. 30, 2010

(51) Int. Cl.
*H04N 5/445* (2011.01)
*H04N 21/482* (2006.01)
*H04N 21/431* (2006.01)
*G06F 3/00* (2006.01)
*G06F 3/048* (2006.01)

(52) U.S. Cl.
CPC ....... *H04N 21/4828* (2013.01); *H04N 21/4312* (2013.01)
USPC ................. 725/53; 725/52; 725/61; 715/777; 715/792

(58) Field of Classification Search
USPC .................................... 725/43, 52, 53, 57, 61
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,158,155 A | 10/1992 | Domain et al. |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,442,390 A | 8/1995 | Hooper et al. |
| 5,473,362 A | 12/1995 | Fitzgerald et al. |
| 5,479,266 A | 12/1995 | Young et al. |
| 5,479,268 A | 12/1995 | Young et al. |
| 5,499,103 A | 3/1996 | Mankovitz |
| 5,510,811 A | 4/1996 | Tobey et al. |
| 5,512,963 A | 4/1996 | Mankovitz |
| 5,515,173 A | 5/1996 | Mankovitz et al. |
| 5,517,257 A | 5/1996 | Dunn et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,585,838 A | 12/1996 | Lawler et al. |
| 5,600,368 A | 2/1997 | Matthews |
| 5,600,711 A | 2/1997 | Yuen |
| 5,616,876 A | 4/1997 | Cluts |
| 5,619,274 A | 4/1997 | Roop et al. |

(Continued)

*Primary Examiner* — Chris Parry

(57) ABSTRACT

In one of many possible embodiments, a system includes a media content processing subsystem configured to display an interactive search graphical user interface having at least a first viewing pane and a second viewing pane. A user may input a sequence of at least one character into the first viewing pane. A search results list including at least one entry based the character sequence and corresponding to at least one media content instance may then be displayed within the second viewing pane. When an entry within the search results list is selected by the user, the media content processing subsystem is configured to transfer the display of the search results list to the first viewing pane and display information corresponding to the selected entry within the second viewing pane.

24 Claims, 18 Drawing Sheets

U.S. PATENT DOCUMENTS

| | | | |
|---|---|---|---|
| 5,623,613 A | 4/1997 | Rowe et al. |
| 5,630,119 A | 5/1997 | Aristides et al. |
| 5,640,484 A | 6/1997 | Mankovitz |
| 5,648,824 A | 7/1997 | Dunn et al. |
| 5,654,748 A | 8/1997 | Matthews |
| 5,657,072 A | 8/1997 | Aristides et al. |
| 5,671,398 A | 9/1997 | Neubauer |
| 5,673,401 A | 9/1997 | Volk et al. |
| 5,677,708 A | 10/1997 | Matthews et al. |
| 5,678,012 A | 10/1997 | Kimmich et al. |
| 5,682,511 A | 10/1997 | Sposato et al. |
| 5,684,525 A | 11/1997 | Klosterman |
| 5,687,331 A | 11/1997 | Volk et al. |
| 5,689,663 A | 11/1997 | Williams |
| 5,699,107 A | 12/1997 | Lawler et al. |
| 5,701,383 A | 12/1997 | Russo et al. |
| 5,706,145 A | 1/1998 | Hindman et al. |
| 5,721,829 A | 2/1998 | Dunn et al. |
| 5,724,492 A | 3/1998 | Matthews et al. |
| 5,727,060 A | 3/1998 | Young |
| 5,731,844 A | 3/1998 | Rauch et al. |
| 5,734,786 A | 3/1998 | Mankovitz |
| 5,734,823 A | 3/1998 | Saigh et al. |
| 5,734,891 A | 3/1998 | Saigh |
| 5,745,095 A | 4/1998 | Parchem et al. |
| 5,745,713 A | 4/1998 | Ferguson et al. |
| 5,751,282 A | 5/1998 | Girard et al. |
| 5,752,160 A | 5/1998 | Dunn |
| 5,757,417 A | 5/1998 | Aras et al. |
| 5,758,258 A | 5/1998 | Shoff et al. |
| 5,758,259 A | 5/1998 | Lawler |
| 5,774,172 A | 6/1998 | Kapell et al. |
| 5,781,228 A | 7/1998 | Sposato |
| 5,790,115 A | 8/1998 | Pleyer et al. |
| 5,790,198 A | 8/1998 | Roop et al. |
| 5,793,973 A | 8/1998 | Birdwell et al. |
| 5,801,787 A | 9/1998 | Schein et al. |
| 5,805,165 A | 9/1998 | Thorne et al. |
| 5,805,763 A | 9/1998 | Lawler et al. |
| 5,808,608 A | 9/1998 | Young et al. |
| 5,809,204 A | 9/1998 | Young et al. |
| 5,812,123 A | 9/1998 | Rowe et al. |
| 5,812,205 A | 9/1998 | Milnes et al. |
| 5,815,145 A | 9/1998 | Matthews |
| 5,815,195 A | 9/1998 | Tam |
| 5,828,945 A | 10/1998 | Klosterman |
| 5,857,190 A | 1/1999 | Brown |
| 5,861,906 A | 1/1999 | Dunn et al. |
| 5,870,150 A | 2/1999 | Yuen |
| 5,872,588 A | 2/1999 | Aras et al. |
| 5,874,985 A | 2/1999 | Matthews |
| 5,878,141 A | 3/1999 | Daly et al. |
| 5,883,627 A | 3/1999 | Pleyer |
| 5,886,746 A | 3/1999 | Yuen et al. |
| 5,900,905 A | 5/1999 | Shoff et al. |
| 5,905,522 A | 5/1999 | Lawler |
| 5,907,323 A | 5/1999 | Lawler et al. |
| 5,914,746 A | 6/1999 | Matthews et al. |
| 5,915,026 A | 6/1999 | Mankovitz |
| 5,923,362 A | 7/1999 | Klosterman |
| 5,940,073 A | 8/1999 | Klosterman et al. |
| 5,940,074 A | 8/1999 | Britt et al. |
| 5,945,987 A | 8/1999 | Dunn |
| 5,945,991 A | 8/1999 | Britt et al. |
| 5,949,954 A | 9/1999 | Young et al. |
| 5,959,688 A | 9/1999 | Schein et al. |
| 5,969,748 A | 10/1999 | Casement et al. |
| 5,970,206 A | 10/1999 | Yuen et al. |
| 5,974,222 A | 10/1999 | Yuen et al. |
| 5,987,213 A | 11/1999 | Mankovitz et al. |
| 5,987,509 A | 11/1999 | Portuesi |
| 5,988,078 A | 11/1999 | Levine |
| 5,990,883 A | 11/1999 | Byrne et al. |
| 5,991,498 A | 11/1999 | Young |
| 6,002,394 A | 12/1999 | Schein et al. |
| 6,002,852 A | 12/1999 | Birdwell et al. |
| 6,005,563 A | 12/1999 | White et al. |
| 6,008,803 A | 12/1999 | Rowe et al. |
| 6,008,836 A | 12/1999 | Bruck et al. |
| 6,014,706 A | 1/2000 | Cannon et al. |
| 6,016,141 A | 1/2000 | Knudson et al. |
| 6,025,837 A | 2/2000 | Matthews et al. |
| 6,028,599 A | 2/2000 | Yuen et al. |
| 6,028,604 A | 2/2000 | Matthews et al. |
| 6,034,689 A | 3/2000 | White et al. |
| 6,049,652 A | 4/2000 | Yuen et al. |
| 6,052,145 A | 4/2000 | Macrae et al. |
| 6,055,314 A | 4/2000 | Spies et al. |
| D424,061 S | 5/2000 | Backs et al. |
| D424,577 S | 5/2000 | Backs et al. |
| 6,072,485 A | 6/2000 | Barnes et al. |
| 6,072,983 A | 6/2000 | Klosterman |
| 6,075,551 A | 6/2000 | Berezowski et al. |
| 6,075,575 A | 6/2000 | Schein et al. |
| 6,078,348 A | 6/2000 | Klosterman et al. |
| 6,091,882 A | 7/2000 | Yuen et al. |
| 6,098,086 A | 8/2000 | Krueger et al. |
| 6,118,492 A | 9/2000 | Milnes et al. |
| D431,552 S | 10/2000 | Backs et al. |
| 6,133,909 A | 10/2000 | Schein et al. |
| 6,133,913 A | 10/2000 | White et al. |
| 6,137,950 A | 10/2000 | Yuen |
| 6,141,003 A | 10/2000 | Chor et al. |
| 6,141,678 A | 10/2000 | Britt |
| D433,403 S | 11/2000 | Backs et al. |
| D434,043 S | 11/2000 | Holland et al. |
| 6,144,378 A | 11/2000 | Lee |
| 6,144,401 A | 11/2000 | Casement et al. |
| 6,144,964 A | 11/2000 | Breese et al. |
| 6,151,059 A | 11/2000 | Schein et al. |
| 6,154,205 A | 11/2000 | Carroll et al. |
| D435,561 S | 12/2000 | Pettigrew et al. |
| 6,160,549 A | 12/2000 | Touma et al. |
| 6,167,188 A | 12/2000 | Young et al. |
| 6,169,541 B1 | 1/2001 | Smith |
| 6,173,317 B1 | 1/2001 | Chaddha et al. |
| 6,177,931 B1 | 1/2001 | Alexander et al. |
| 6,177,945 B1 | 1/2001 | Pleyer |
| 6,182,072 B1 | 1/2001 | Leak et al. |
| 6,184,877 B1 | 2/2001 | Dodson et al. |
| 6,188,401 B1 | 2/2001 | Peyer |
| 6,215,483 B1 | 4/2001 | Zigmond |
| 6,215,526 B1 | 4/2001 | Barton et al. |
| 6,216,265 B1 | 4/2001 | Roop et al. |
| 6,230,319 B1 | 5/2001 | Britt et al. |
| 6,233,389 B1 | 5/2001 | Barton et al. |
| 6,237,022 B1 | 5/2001 | Bruck et al. |
| 6,239,794 B1 | 5/2001 | Yuen et al. |
| 6,240,555 B1 | 5/2001 | Shoff et al. |
| 6,247,176 B1 | 6/2001 | Schein et al. |
| D445,801 S | 7/2001 | Ma |
| 6,259,442 B1 | 7/2001 | Britt et al. |
| 6,262,722 B1 | 7/2001 | Allison et al. |
| 6,263,501 B1 | 7/2001 | Schein et al. |
| 6,266,059 B1 | 7/2001 | Matthews et al. |
| 6,268,856 B1 | 7/2001 | Bruck et al. |
| 6,292,834 B1 | 9/2001 | Ravi et al. |
| 6,304,969 B1 | 10/2001 | Wasserman et al. |
| 6,308,202 B1 | 10/2001 | Cohn et al. |
| 6,310,886 B1 | 10/2001 | Barton |
| 6,311,197 B2 | 10/2001 | Mighdoll et al. |
| 6,311,207 B1 | 10/2001 | Mighdoll et al. |
| D450,058 S | 11/2001 | Istvan et al. |
| D450,324 S | 11/2001 | Istvan et al. |
| D450,711 S | 11/2001 | Istvan et al. |
| 6,313,851 B1 | 11/2001 | Matthews et al. |
| 6,317,780 B1 | 11/2001 | Cohn et al. |
| 6,317,791 B1 | 11/2001 | Cohn et al. |
| 6,317,885 B1 | 11/2001 | Fries |
| 6,323,911 B1 | 11/2001 | Schein et al. |
| 6,327,418 B1 | 12/2001 | Barton |
| 6,330,719 B1 | 12/2001 | Zigmond et al. |
| 6,340,997 B1 | 1/2002 | Borseth |
| 6,341,195 B1 | 1/2002 | Mankovitz et al. |
| 6,341,374 B2 | 1/2002 | Schein et al. |
| D453,767 S | 2/2002 | Istvan et al. |
| D453,768 S | 2/2002 | Wilkins |

| Patent | Kind | Date | Inventor |
|---|---|---|---|
| D453,936 | S | 2/2002 | Istvan et al. |
| 6,344,865 | B1 | 2/2002 | Matthews et al. |
| 6,345,264 | B1 | 2/2002 | Breese et al. |
| 6,347,398 | B1 | 2/2002 | Parthasarathy et al. |
| 6,348,935 | B1 | 2/2002 | Malacinski et al. |
| 6,353,813 | B1 | 3/2002 | Breese et al. |
| 6,378,035 | B1 | 4/2002 | Parry et al. |
| 6,380,957 | B1 | 4/2002 | Banning |
| 6,385,739 | B1 | 5/2002 | Barton et al. |
| 6,388,714 | B1 | 5/2002 | Schein et al. |
| 6,392,664 | B1 | 5/2002 | White et al. |
| 6,396,473 | B1 | 5/2002 | Callahan et al. |
| 6,396,546 | B1 | 5/2002 | Alten et al. |
| 6,397,388 | B1 | 5/2002 | Allen |
| 6,400,407 | B1 | 6/2002 | Zigmond et al. |
| 6,412,110 | B1 | 6/2002 | Schein et al. |
| 6,412,112 | B1 | 6/2002 | Barrett et al. |
| 6,421,072 | B1 | 7/2002 | Ku et al. |
| 6,424,342 | B1 | 7/2002 | Perlman et al. |
| 6,425,125 | B1 | 7/2002 | Fries et al. |
| 6,430,358 | B1 | 8/2002 | Yuen et al. |
| 6,430,359 | B1 | 8/2002 | Yuen et al. |
| D462,333 | S | 9/2002 | Novak |
| D462,339 | S | 9/2002 | Allen et al. |
| D463,444 | S | 9/2002 | Istvan et al. |
| 6,449,766 | B1 | 9/2002 | Fleming |
| 6,453,471 | B1 | 9/2002 | Klosterman |
| D463,788 | S | 10/2002 | Smith et al. |
| 6,460,180 | B1 | 10/2002 | Park et al. |
| 6,460,181 | B1 | 10/2002 | Donnelly |
| 6,463,486 | B1 | 10/2002 | Parry et al. |
| 6,466,734 | B2 | 10/2002 | Yuen et al. |
| 6,469,721 | B2 | 10/2002 | Matthews et al. |
| 6,469,753 | B1 | 10/2002 | Klosterman et al. |
| 6,473,858 | B1 | 10/2002 | Shimomura et al. |
| D465,227 | S | 11/2002 | Ro et al. |
| 6,477,705 | B1 | 11/2002 | Yuen et al. |
| 6,480,836 | B1 | 11/2002 | Colby et al. |
| 6,487,646 | B1 | 11/2002 | Adams et al. |
| 6,489,986 | B1 | 12/2002 | Allen |
| 6,490,722 | B1 | 12/2002 | Barton et al. |
| 6,496,205 | B1 | 12/2002 | White et al. |
| 6,498,754 | B2 | 12/2002 | Peting et al. |
| 6,498,895 | B2 | 12/2002 | Young et al. |
| 6,499,057 | B1 | 12/2002 | Portuesi |
| D468,274 | S | 1/2003 | Novak |
| D469,104 | S | 1/2003 | Istvan et al. |
| D469,443 | S | 1/2003 | Wilkins et al. |
| 6,505,232 | B1 | 1/2003 | Mighdoll et al. |
| 6,505,348 | B1 | 1/2003 | Knowles et al. |
| D470,152 | S | 2/2003 | Witus |
| D470,153 | S | 2/2003 | Billmaier et al. |
| 6,519,771 | B1 | 2/2003 | Zenith |
| 6,526,471 | B1 | 2/2003 | Shimomura et al. |
| 6,526,580 | B2 | 2/2003 | Shimomura et al. |
| 6,529,233 | B1 | 3/2003 | Allen |
| 6,535,253 | B2 | 3/2003 | Barton et al. |
| 6,535,920 | B1 | 3/2003 | Parry et al. |
| 6,538,701 | B1 | 3/2003 | Yuen |
| 6,539,375 | B2 | 3/2003 | Kawasaki |
| 6,549,719 | B2 | 4/2003 | Mankovitz |
| D474,197 | S | 5/2003 | Nguyen |
| 6,559,866 | B2 | 5/2003 | Kolde et al. |
| 6,559,894 | B2 | 5/2003 | Omura et al. |
| 6,560,678 | B1 | 5/2003 | Weissman et al. |
| 6,560,777 | B2 | 5/2003 | Blackketter et al. |
| 6,564,379 | B1 | 5/2003 | Knudson et al. |
| 6,567,606 | B2 | 5/2003 | Milnes et al. |
| 6,570,581 | B1 | 5/2003 | Smith |
| 6,571,390 | B1 | 5/2003 | Dunn et al. |
| 6,571,392 | B1 | 5/2003 | Zigmond et al. |
| D475,718 | S | 6/2003 | Witus et al. |
| 6,577,346 | B1 | 6/2003 | Perlman |
| D476,994 | S | 7/2003 | Simmons et al. |
| 6,588,013 | B1 | 7/2003 | Lumley et al. |
| 6,594,653 | B2 | 7/2003 | Colby et al. |
| D478,090 | S | 8/2003 | Nguyen et al. |
| D478,595 | S | 8/2003 | Istvan et al. |
| D478,912 | S | 8/2003 | Johnson |
| 6,606,652 | B1 | 8/2003 | Cohn et al. |
| 6,628,301 | B1 | 9/2003 | Acton et al. |
| 6,628,302 | B2 | 9/2003 | White et al. |
| D480,733 | S | 10/2003 | Hammerquist et al. |
| 6,630,963 | B1 | 10/2003 | Billmaier |
| 6,631,523 | B1 | 10/2003 | Matthews et al. |
| 6,633,877 | B1 | 10/2003 | Saigh et al. |
| 6,637,031 | B1 | 10/2003 | Chou |
| 6,637,032 | B1 | 10/2003 | Feinleib |
| 6,642,939 | B1 | 11/2003 | Vallone et al. |
| 6,643,798 | B2 | 11/2003 | Barton et al. |
| 6,651,251 | B1 | 11/2003 | Shoff et al. |
| RE38,376 | E | 12/2003 | Matthews, III |
| 6,662,218 | B2 | 12/2003 | Mighdoll et al. |
| 6,668,133 | B2 | 12/2003 | Yuen et al. |
| 6,668,377 | B1 | 12/2003 | Dunn |
| 6,678,737 | B1 | 1/2004 | Bucher |
| 6,681,396 | B1 | 1/2004 | Bates et al. |
| 6,683,630 | B1 | 1/2004 | Shoff et al. |
| 6,684,025 | B1 | 1/2004 | Perlman |
| D486,834 | S | 2/2004 | Allen et al. |
| 6,687,906 | B1 | 2/2004 | Yuen et al. |
| 6,694,352 | B1 | 2/2004 | Omoigui |
| 6,698,020 | B1 | 2/2004 | Zigmond et al. |
| 6,704,058 | B2 | 3/2004 | Ranta |
| 6,704,773 | B1 | 3/2004 | Cohn et al. |
| 6,704,776 | B1 | 3/2004 | Fortune |
| 6,704,813 | B2 | 3/2004 | Smirnov et al. |
| 6,704,929 | B1 | 3/2004 | Ozer et al. |
| 6,708,335 | B1 | 3/2004 | Ozer et al. |
| 6,710,815 | B1 | 3/2004 | Billmaier et al. |
| 6,721,953 | B1 | 4/2004 | Bates et al. |
| 6,724,405 | B2 | 4/2004 | Matthews et al. |
| 6,727,935 | B1 | 4/2004 | Allen et al. |
| 6,728,713 | B1 | 4/2004 | Beach et al. |
| D490,086 | S | 5/2004 | Wilkins et al. |
| 6,732,325 | B1 | 5/2004 | Tash et al. |
| 6,732,369 | B1 | 5/2004 | Schein et al. |
| 6,742,043 | B1 | 5/2004 | Moussa et al. |
| 6,742,183 | B1 | 5/2004 | Reynolds et al. |
| 6,745,391 | B1 | 6/2004 | Macrae et al. |
| 6,748,375 | B1 | 6/2004 | Wong et al. |
| 6,748,481 | B1 | 6/2004 | Parry et al. |
| 6,754,626 | B2 | 6/2004 | Epstein |
| 6,754,715 | B1 | 6/2004 | Cannon et al. |
| 6,756,997 | B1 | 6/2004 | Ward et al. |
| 6,757,837 | B1 | 6/2004 | Platt et al. |
| 6,757,906 | B1 | 6/2004 | Look et al. |
| 6,760,537 | B2 | 7/2004 | Mankovitz |
| 6,762,773 | B2 | 7/2004 | Kolde et al. |
| 6,766,523 | B2 | 7/2004 | Herley |
| 6,766,524 | B1 | 7/2004 | Matheny et al. |
| D494,186 | S | 8/2004 | Johnson |
| 6,772,438 | B1 | 8/2004 | Blackketter et al. |
| 6,785,901 | B1 | 8/2004 | Horiwitz et al. |
| 6,785,902 | B1 | 8/2004 | Zigmond et al. |
| D496,665 | S | 9/2004 | Billmaier et al. |
| 6,792,195 | B2 | 9/2004 | Barton |
| 6,798,457 | B2 | 9/2004 | Boyden et al. |
| 6,798,971 | B2 | 9/2004 | Potrebic |
| 6,799,326 | B2 | 9/2004 | Boylan et al. |
| 6,799,327 | B1 | 9/2004 | Reynolds et al. |
| 6,804,824 | B1 | 10/2004 | Potrebic et al. |
| 6,804,825 | B1 | 10/2004 | White et al. |
| 6,813,643 | B2 | 11/2004 | Perlman |
| 6,816,175 | B1 | 11/2004 | Hamp et al. |
| 6,819,344 | B1 | 11/2004 | Robbins |
| 6,820,111 | B1 | 11/2004 | Rubin et al. |
| 6,820,144 | B2 | 11/2004 | Smirnov et al. |
| 6,829,779 | B1 | 12/2004 | Perlman |
| 6,842,837 | B1 | 1/2005 | Peting et al. |
| 6,847,778 | B1 | 1/2005 | Vallone et al. |
| 6,847,779 | B2 | 1/2005 | Pietraszak |
| 6,850,691 | B1 | 2/2005 | Stam et al. |
| 6,850,693 | B2 | 2/2005 | Young et al. |
| 6,859,799 | B1 | 2/2005 | Yuen |
| 6,859,937 | B1 | 2/2005 | Narayan et al. |
| 6,861,952 | B1 | 3/2005 | Billmaier |
| 6,865,555 | B2 | 3/2005 | Novak |

| Patent No. | Date | Inventor |
|---|---|---|
| 6,868,225 B1 | 3/2005 | Brown et al. |
| 6,868,551 B1 | 3/2005 | Lawler et al. |
| 6,886,179 B1 | 4/2005 | Perlman |
| 6,891,553 B2 | 5/2005 | White et al. |
| 6,892,390 B1 | 5/2005 | Lieberman et al. |
| 6,897,904 B2 | 5/2005 | Potrebic et al. |
| 6,898,765 B2 | 5/2005 | Matthews et al. |
| 6,901,453 B1 | 5/2005 | Pritchett et al. |
| 6,903,753 B1 | 6/2005 | Gray et al. |
| 6,904,609 B1 | 6/2005 | Pietraszak et al. |
| 6,906,755 B2 | 6/2005 | Lundblad et al. |
| 6,907,576 B2 | 6/2005 | Barbanson et al. |
| 6,915,528 B1 | 7/2005 | McKenna |
| 6,928,652 B1 | 8/2005 | Goldman |
| 6,928,655 B1 | 8/2005 | Omoigui |
| 6,931,657 B1 | 8/2005 | Marsh |
| 6,938,077 B2 | 8/2005 | Sanders |
| 6,938,270 B2 | 8/2005 | Blackketter et al. |
| 6,941,575 B2 | 9/2005 | Allen |
| 6,943,843 B2 | 9/2005 | Boyden et al. |
| 6,944,880 B1 | 9/2005 | Allen |
| 6,947,935 B1 | 9/2005 | Horvitz et al. |
| 6,952,208 B1 | 10/2005 | Arquie et al. |
| 6,957,260 B1 | 10/2005 | Mighdoll et al. |
| 6,963,903 B2 | 11/2005 | Krueger et al. |
| 6,963,906 B2 | 11/2005 | Portuesi |
| 6,965,415 B2 | 11/2005 | Lundblad et al. |
| 6,965,730 B2 | 11/2005 | Chamberlin et al. |
| 6,966,066 B1 | 11/2005 | Zigmond et al. |
| 6,968,364 B1 | 11/2005 | Wong et al. |
| 6,970,640 B2 | 11/2005 | Green et al. |
| 6,972,787 B1 | 12/2005 | Allen et al. |
| 6,973,050 B2 | 12/2005 | Birdwell et al. |
| 6,973,664 B2 | 12/2005 | Fries |
| 6,973,669 B2 | 12/2005 | Daniels |
| 6,975,713 B1 | 12/2005 | Smith et al. |
| 6,975,717 B1 | 12/2005 | Smith et al. |
| 6,980,638 B1 | 12/2005 | Smith et al. |
| 6,980,993 B2 | 12/2005 | Horvitz et al. |
| 6,981,227 B1 | 12/2005 | Taylor |
| 6,983,426 B1 | 1/2006 | Kobayashi et al. |
| 6,986,062 B2 | 1/2006 | Carpenter |
| 6,990,462 B1 | 1/2006 | Wilcox et al. |
| 6,990,497 B2 | 1/2006 | O'Rourke et al. |
| 6,990,671 B1 | 1/2006 | Evans et al. |
| 6,990,677 B1 | 1/2006 | Pietraszak et al. |
| 6,990,678 B2 | 1/2006 | Zigmond |
| 6,993,532 B1 | 1/2006 | Platt et al. |
| 6,996,390 B2 | 2/2006 | Herley et al. |
| 7,003,795 B2 | 2/2006 | Allen |
| 7,006,613 B2 | 2/2006 | Novak et al. |
| 7,007,244 B2 | 2/2006 | Pankovcin |
| D516,573 S | 3/2006 | Gibson |
| D517,059 S | 3/2006 | Newby et al. |
| D517,087 S | 3/2006 | Sands |
| 7,010,265 B2 | 3/2006 | Coffin |
| 7,013,238 B1 | 3/2006 | Weare |
| 7,015,925 B2 | 3/2006 | Ford et al. |
| 7,017,174 B1 | 3/2006 | Sheedy |
| D518,487 S | 4/2006 | MacKenzie et al. |
| D519,122 S | 4/2006 | MacKenzie et al. |
| D519,519 S | 4/2006 | Vong |
| D519,521 S | 4/2006 | Fong |
| 7,023,492 B2 | 4/2006 | Sullivan |
| 7,024,424 B1 | 4/2006 | Platt et al. |
| 7,026,964 B2 | 4/2006 | Baldwin et al. |
| 7,027,101 B1 | 4/2006 | Sloo et al. |
| 7,028,325 B1 | 4/2006 | Rui et al. |
| 7,030,886 B2 | 4/2006 | Ford et al. |
| 7,032,177 B2 | 4/2006 | Novak et al. |
| 7,034,776 B1 | 4/2006 | Love |
| 7,034,927 B1 | 4/2006 | Allen et al. |
| 7,035,355 B2 | 4/2006 | Lais et al. |
| 7,035,526 B2 | 4/2006 | Green |
| 7,036,083 B1 | 4/2006 | Zenith |
| 7,036,090 B1 | 4/2006 | Nguyen |
| 7,036,091 B1 | 4/2006 | Nguyen |
| 7,036,092 B2 | 4/2006 | Sloo et al. |
| 7,036,138 B1 | 4/2006 | Tash |
| 7,038,690 B2 | 5/2006 | Wilt et al. |
| 7,039,935 B2 | 5/2006 | Knudson et al. |
| 7,042,526 B1 | 5/2006 | Borseth |
| 7,043,477 B2 | 5/2006 | Mercer et al. |
| 7,046,805 B2 | 5/2006 | Fitzhardinge et al. |
| 7,050,097 B2 | 5/2006 | Schick et al. |
| 7,050,867 B2 | 5/2006 | Maymudes |
| 7,051,111 B1 | 5/2006 | Scullin |
| 7,051,282 B2 | 5/2006 | Marcjan |
| 7,051,351 B2 | 5/2006 | Goldman et al. |
| 7,055,031 B2 | 5/2006 | Platt |
| 7,055,104 B1 | 5/2006 | Billmaier et al. |
| 7,058,720 B1 | 6/2006 | Majidimehr |
| 7,058,816 B2 | 6/2006 | Valeria |
| 7,058,936 B2 | 6/2006 | Chilimbi et al. |
| 7,062,475 B1 | 6/2006 | Szabo et al. |
| 7,065,553 B1 | 6/2006 | Chesley et al. |
| 7,069,284 B2 | 6/2006 | Peting |
| 7,069,576 B1 | 6/2006 | Knudson et al. |
| 7,071,968 B2 | 7/2006 | Novak |
| 7,073,118 B2 | 7/2006 | Greenberg et al. |
| 7,073,193 B2 | 7/2006 | Marsh |
| 7,076,202 B1 | 7/2006 | Billmaier |
| 7,076,734 B2 | 7/2006 | Wolff et al. |
| 7,076,792 B2 | 7/2006 | Zigmond et al. |
| 7,076,794 B2 | 7/2006 | Lieberman et al. |
| 7,080,394 B2 | 7/2006 | Istvan et al. |
| 7,088,374 B2 | 8/2006 | David et al. |
| 7,088,910 B2 | 8/2006 | Potrebic et al. |
| 7,093,273 B2 | 8/2006 | Marsh |
| 7,098,868 B2 | 8/2006 | Love et al. |
| 7,099,952 B2 | 8/2006 | Wong et al. |
| 7,103,904 B1 | 9/2006 | Blackketter et al. |
| 7,103,905 B2 | 9/2006 | Novak |
| 7,103,908 B2 | 9/2006 | Tomsen |
| 7,107,532 B1 | 9/2006 | Billmaier et al. |
| 7,107,608 B2 | 9/2006 | Wagner et al. |
| 7,111,320 B1 | 9/2006 | Novak |
| 7,116,894 B1 | 10/2006 | Chatterton |
| 7,117,439 B2 | 10/2006 | Barrett et al. |
| 7,124,369 B2 | 10/2006 | Beaudoin |
| 7,127,127 B2 | 10/2006 | Jojic et al. |
| 7,130,846 B2 * | 10/2006 | Danker et al. .................. 707/3 |
| 7,131,054 B2 | 10/2006 | Greenberg et al. |
| 7,142,230 B2 | 11/2006 | Novak et al. |
| 7,146,632 B2 | 12/2006 | Miller |
| 7,155,675 B2 | 12/2006 | Billmaier et al. |
| 7,155,734 B2 | 12/2006 | Shimomura et al. |
| 7,158,531 B2 | 1/2007 | Barton |
| 7,159,176 B2 | 1/2007 | Billmaier et al. |
| 7,159,177 B2 | 1/2007 | Billmaier et al. |
| 7,161,877 B2 | 1/2007 | Lai et al. |
| 7,161,994 B2 | 1/2007 | Shah et al. |
| 7,162,728 B1 | 1/2007 | Bahn |
| 7,165,264 B1 | 1/2007 | Westrick |
| 7,167,531 B2 | 1/2007 | Greenberg et al. |
| 7,194,511 B2 | 3/2007 | Stettner |
| 7,194,754 B2 | 3/2007 | Tomsen et al. |
| 7,197,234 B1 | 3/2007 | Chatterton |
| 7,197,715 B1 | 3/2007 | Valeria |
| 7,200,321 B2 | 4/2007 | Otala et al. |
| 7,200,859 B1 | 4/2007 | Perlman et al. |
| 7,203,952 B2 | 4/2007 | Broadus |
| 7,210,093 B1 * | 4/2007 | Dutta .......................... 715/210 |
| 7,216,235 B1 | 5/2007 | Platt |
| 7,228,556 B2 * | 6/2007 | Beach et al. ..................... 725/53 |
| 7,236,204 B2 | 6/2007 | Perlman |
| 7,237,252 B2 | 6/2007 | Billmaier |
| 7,242,413 B2 | 7/2007 | Chu et al. |
| 7,243,123 B1 | 7/2007 | Allen et al. |
| 7,245,817 B1 | 7/2007 | Nichols et al. |
| 7,251,255 B1 | 7/2007 | Young |
| 7,251,294 B2 | 7/2007 | Peting |
| 7,263,362 B1 | 8/2007 | Young et al. |
| D551,668 S | 9/2007 | Newby et al. |
| 7,266,785 B2 | 9/2007 | Grotjohn |
| 7,266,832 B2 | 9/2007 | Miller |
| 7,266,835 B2 | 9/2007 | Halbert |
| 7,272,298 B1 | 9/2007 | Lang et al. |

| | | |
|---|---|---|
| 7,272,657 B2 | 9/2007 | Allen et al. |
| D552,610 S | 10/2007 | Newby et al. |
| 7,290,222 B2 | 10/2007 | Guido et al. |
| 7,302,696 B1 | 11/2007 | Yamamoto |
| 7,310,355 B1 | 12/2007 | Krein et al. |
| 7,313,802 B1 | 12/2007 | Tomsen |
| 7,320,134 B1 | 1/2008 | Tomsen et al. |
| 7,320,137 B1 | 1/2008 | Novak et al. |
| 7,321,716 B1 | 1/2008 | Vallone et al. |
| 7,340,761 B2 | 3/2008 | Billmaier |
| 7,350,157 B1 | 3/2008 | Billmaier et al. |
| 7,360,167 B2 | 4/2008 | Hennum et al. |
| 7,360,175 B2 | 4/2008 | Gardner et al. |
| 7,360,232 B2 | 4/2008 | Mitchell |
| 7,380,260 B1 | 5/2008 | Billmaier et al. |
| 7,382,838 B2 | 6/2008 | Peting |
| 7,386,129 B2 | 6/2008 | Perlman |
| 7,391,808 B1 | 6/2008 | Farrand |
| 7,409,546 B2 | 8/2008 | Platt |
| 7,418,670 B2 | 8/2008 | Goldsmith |
| 7,428,023 B2 | 9/2008 | Allen et al. |
| 7,434,246 B2 | 10/2008 | Florence |
| 7,440,523 B2 | 10/2008 | Lais et al. |
| 7,463,737 B2 | 12/2008 | Gillon et al. |
| 7,466,640 B2 | 12/2008 | Snow et al. |
| 7,475,365 B2 | 1/2009 | Nan et al. |
| 7,484,234 B1 | 1/2009 | Heaton et al. |
| 7,487,459 B2 | 2/2009 | Billmaier et al. |
| 7,487,529 B1 | 2/2009 | Orlick |
| 7,493,015 B1 | 2/2009 | Van Stam et al. |
| 7,496,830 B2 | 2/2009 | Rubin et al. |
| 7,506,350 B2 * | 3/2009 | Johnson .................. 725/53 |
| 7,518,629 B2 | 4/2009 | Novak et al. |
| 7,529,465 B2 | 5/2009 | Barton et al. |
| 7,533,355 B2 | 5/2009 | Aritomi |
| 7,533,403 B1 | 5/2009 | Krein et al. |
| 7,543,325 B2 | 6/2009 | Westbrook et al. |
| 7,546,622 B2 | 6/2009 | Tash |
| 7,558,472 B2 | 7/2009 | Locket et al. |
| 7,571,156 B1 | 8/2009 | Gupta et al. |
| 7,573,529 B1 | 8/2009 | Perlman |
| 7,574,656 B2 | 8/2009 | Billmaier et al. |
| 7,587,679 B1 | 9/2009 | Sundermeyer et al. |
| 7,590,240 B2 | 9/2009 | Platt et al. |
| 7,594,246 B1 | 9/2009 | Billmaier et al. |
| 7,596,533 B2 | 9/2009 | Szabo et al. |
| 7,600,185 B2 | 10/2009 | Asakawa et al. |
| 7,600,243 B2 * | 10/2009 | Brain et al. .................. 725/44 |
| 7,650,569 B1 | 1/2010 | Allen et al. |
| 7,661,121 B2 | 2/2010 | Smith et al. |
| 7,665,111 B1 | 2/2010 | Barton et al. |
| 7,668,435 B2 | 2/2010 | Lockett et al. |
| 7,671,758 B1 | 3/2010 | Seidel et al. |
| 2001/0029610 A1 | 10/2001 | Corvin et al. |
| 2001/0047298 A1 | 11/2001 | Moore et al. |
| 2001/0049820 A1 | 12/2001 | Barton |
| 2001/0054181 A1 | 12/2001 | Corvin |
| 2002/0073424 A1 | 6/2002 | Ward et al. |
| 2002/0124255 A1 | 9/2002 | Reichardt et al. |
| 2003/0005445 A1 | 1/2003 | Schein et al. |
| 2003/0056219 A1 | 3/2003 | Reichardt et al. |
| 2003/0093613 A1 | 5/2003 | Sherman |
| 2003/0110495 A1 | 6/2003 | Bennington et al. |
| 2003/0110499 A1 | 6/2003 | Knudson et al. |
| 2003/0115599 A1 | 6/2003 | Bennington et al. |
| 2003/0115602 A1 | 6/2003 | Knee et al. |
| 2003/0163813 A1 | 8/2003 | Klosterman et al. |
| 2003/0164858 A1 | 9/2003 | Klosterman et al. |
| 2003/0188310 A1 | 10/2003 | Klosterman et al. |
| 2003/0188311 A1 | 10/2003 | Yuen et al. |
| 2003/0196201 A1 | 10/2003 | Schein et al. |
| 2003/0204847 A1 | 10/2003 | Ellis et al. |
| 2003/0208756 A1 | 11/2003 | Macrae et al. |
| 2003/0221192 A1 | 11/2003 | Rappaport et al. |
| 2004/0010806 A1 | 1/2004 | Yuen et al. |
| 2004/0045025 A1 | 3/2004 | Ward et al. |
| 2004/0093562 A1 * | 5/2004 | Diorio et al. .................. 715/513 |
| 2004/0107437 A1 | 6/2004 | Reichardt et al. |
| 2004/0168189 A1 | 8/2004 | Reynolds et al. |
| 2004/0194138 A1 | 9/2004 | Boylan et al. |
| 2004/0194141 A1 * | 9/2004 | Sanders .................. 725/53 |
| 2004/0243938 A1 | 12/2004 | Weise |
| 2004/0261098 A1 | 12/2004 | Macrae et al. |
| 2005/0010949 A1 | 1/2005 | Ward et al. |
| 2005/0028201 A1 | 2/2005 | Klosterman et al. |
| 2005/0076312 A1 | 4/2005 | Gardner et al. |
| 2005/0125823 A1 | 6/2005 | McCoy et al. |
| 2005/0149964 A1 | 7/2005 | Thomas et al. |
| 2005/0155056 A1 | 7/2005 | Knee et al. |
| 2005/0216936 A1 | 9/2005 | Knudson et al. |
| 2005/0251824 A1 | 11/2005 | Thomas et al. |
| 2005/0257154 A1 | 11/2005 | Bales et al. |
| 2005/0257172 A1 | 11/2005 | Bales et al. |
| 2006/0026639 A1 * | 2/2006 | Potrebic et al. .................. 725/39 |
| 2006/0130098 A1 * | 6/2006 | Rao et al. .................. 725/53 |
| 2006/0156336 A1 | 7/2006 | Knudson et al. |
| 2006/0212894 A1 | 9/2006 | Knudson et al. |
| 2006/0253594 A1 | 11/2006 | Szabo et al. |
| 2006/0277574 A1 | 12/2006 | Schein et al. |
| 2006/0288366 A1 | 12/2006 | Boylan et al. |
| 2007/0016926 A1 | 1/2007 | Ward et al. |
| 2007/0033613 A1 | 2/2007 | Ward et al. |
| 2007/0107010 A1 | 5/2007 | Jolna et al. |
| 2007/0198930 A1 | 8/2007 | Chu et al. |
| 2008/0022308 A1 * | 1/2008 | Garcea .................. 725/46 |
| 2008/0066135 A1 * | 3/2008 | Brodersen et al. .................. 725/134 |
| 2009/0024603 A1 * | 1/2009 | Zink .................. 707/5 |
| 2009/0125843 A1 | 5/2009 | Billmaier et al. |

* cited by examiner

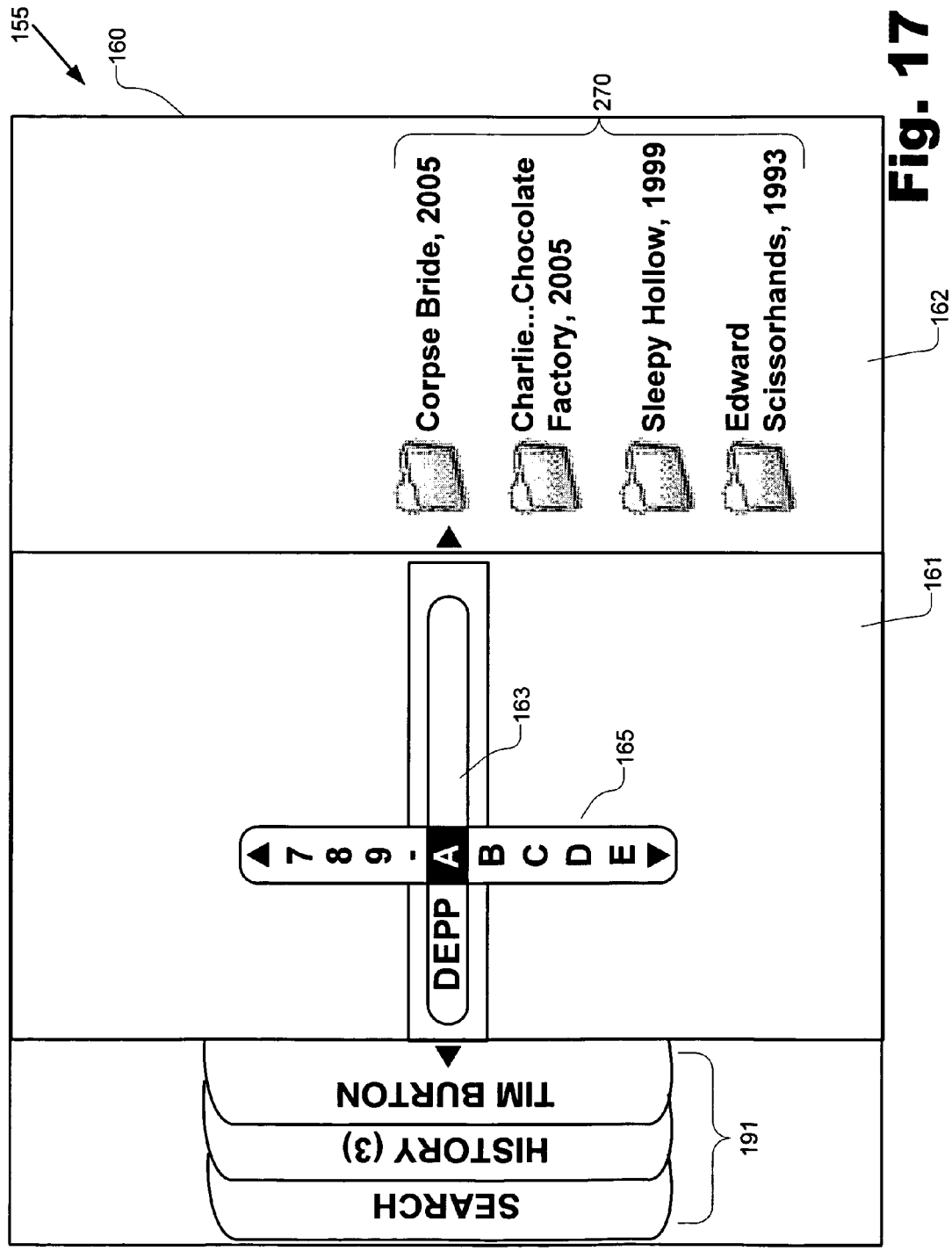

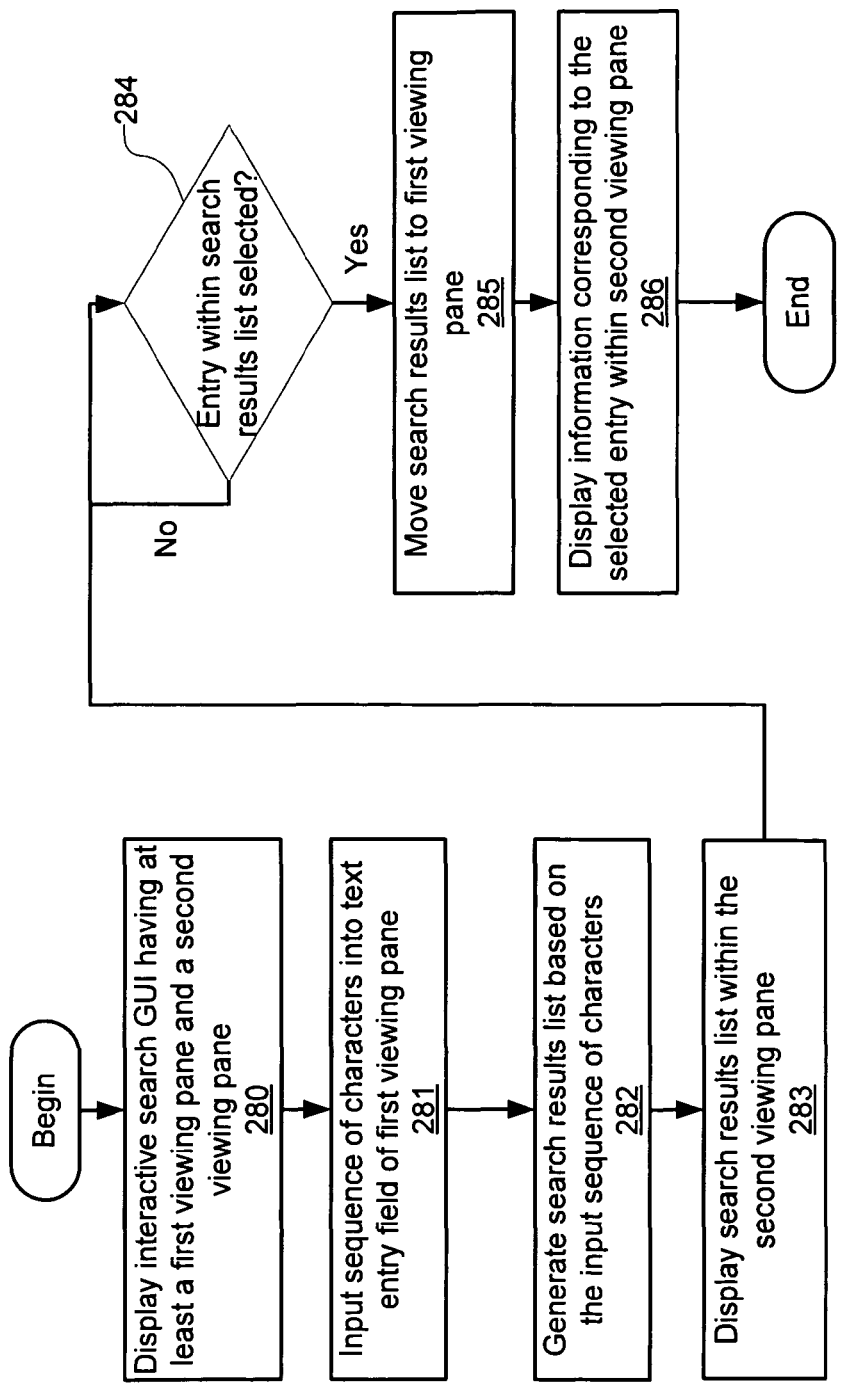

INTERACTIVE SEARCH GRAPHICAL USER INTERFACE SYSTEMS AND METHODS

BACKGROUND INFORMATION

The advent of computers, interactive electronic communication, the Internet, and other advances in the digital realm of consumer electronics have resulted in a great variety of enhanced programming, recording, and viewing options for users who view media content such as television programs. In implementing such enhanced options, the set-top box ("STB") has become an important computing device for accessing media content services and the media content within those services. In addition to supporting traditional analog broadcast video functionality, STBs also support an increasing number of two-way digital services such as video-on-demand, internet protocol television ("IPTV"), and personal video recording.

An STB is typically connected to a cable or satellite, or generally, a subscriber television system, and includes hardware and software necessary to provide enhanced options for a subscriber television system at a subscriber location. Conventional STBs include a processor, communication components, and memory and are connected to a television or other display device, such as a personal computer. While many STBs are stand-alone devices that are externally connected to a television, an STB and/or its functionality may be integrated into a television or personal computer, a mobile device such as a mobile phone or a personal digital assistant ("PDA"), or even into an audio device such as a programmable radio, as is known.

An STB is usually configured to provide users with a large number and variety of media content choices. For example, a user may choose to view a variety of broadcast television programs, pay-per-view services, video-on-demand programming, Internet services, and audio programming via an STB.

However, the large number of media content choices often makes it difficult for an STB user to find and select a desired media content instance for viewing. On-screen program guides have alleviated this confusion to some degree. However, the use of an on-screen program guide is cumbersome in many instances and often results in missed viewing opportunities.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical reference numbers designate identical or similar elements.

FIG. 17 shows another exemplary view of the search GUI, according to an embodiment.

FIG. 18 illustrates an exemplary method of providing a capability of searching and/or browsing through media content that may be available via the processing subsystem, according to an embodiment.

DETAILED DESCRIPTION OF PREFERRED EMBODIMENTS

I. Introduction

Exemplary systems and methods for providing a capability of searching and/or browsing through media content instances that may be available via a media content processing subsystem are described herein. As used herein, the term "media content instance" will be used to refer generally to any television program, on demand program, pay-per-view program, broadcast media program, IPTV, commercial, advertisement, video, movie, song, image, photograph, sound, or any segment of these or other forms of media content that may be experienced or viewed by a user.

The exemplary systems and methods described herein generally enable a user to effectively search for and/or browse through information related to one or more media content instances including, but not limited to, program guide information corresponding to a particular media content instance, names of people associated with a particular media content instance (e.g., actors, directors, character names, etc.), advertising information associated with a particular media content instance, media content instances in the same genre as a particular media content instance, and/or any other information related to a particular media content instance.

In certain embodiments, a media content processing subsystem, such as a set-top box ("STB"), is configured to display an interactive search graphical user interface ("GUI") having at least a first viewing pane and a second viewing pane. The first and second viewing panes may additionally or alternatively be referred to as "primary" and "secondary" viewing panes, respectively. The first viewing pane initially includes a character entry field into which a user may input a sequence of one or more characters. A search results list including one or more entries based on the input character sequence and corresponding to one or more media content instances is then displayed within the second viewing pane. When an entry within the search results list is selected by a user, the media content processing subsystem is configured to transfer the display of the search results list to the first viewing pane and display information corresponding to the selected entry within the second viewing pane.

Components and functions of exemplary embodiments of search GUI systems and methods will now be described in more detail.

II. Exemplary System View

Figure 1:
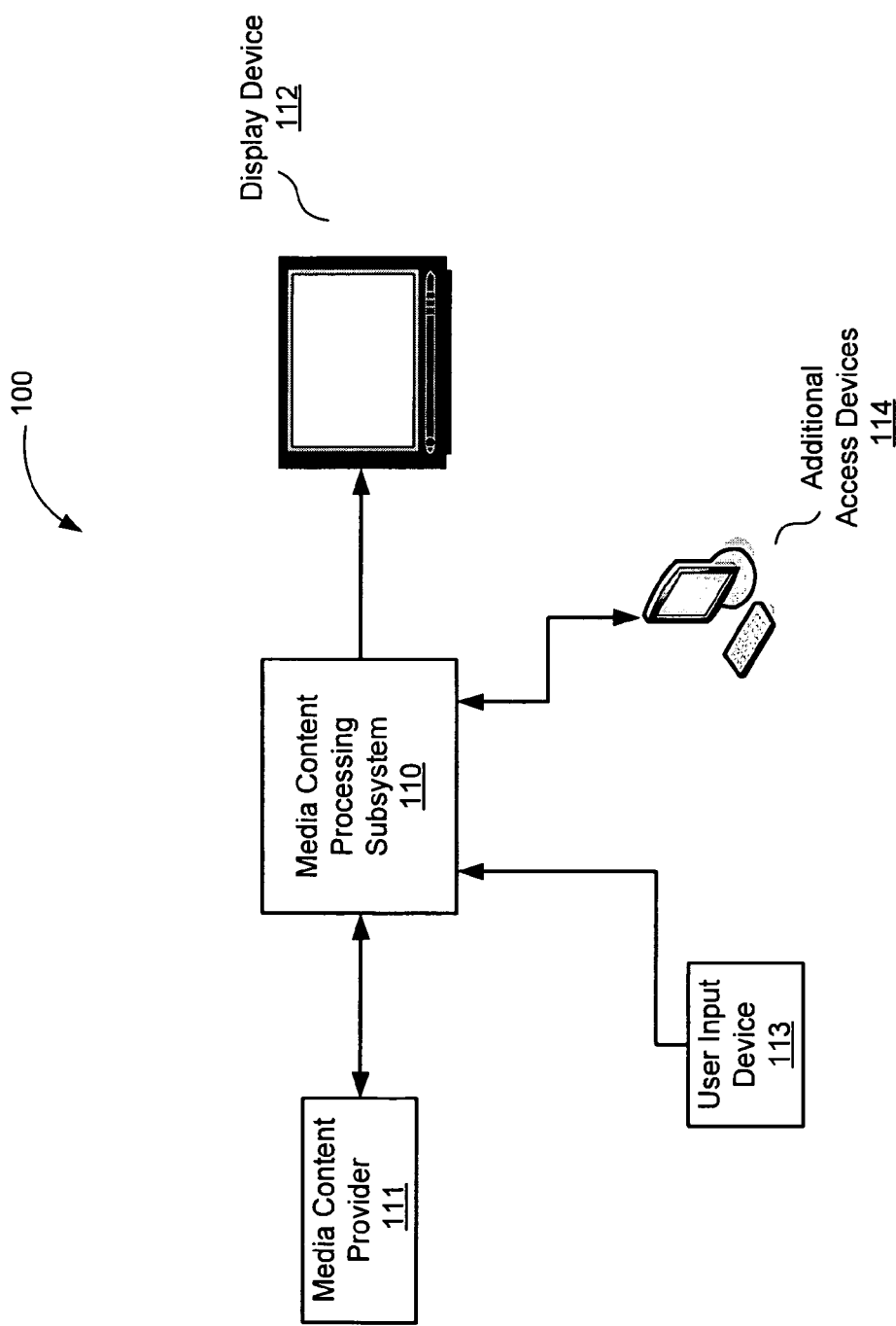
FIG. 1 illustrates an example of a media content access system, according to an embodiment.

FIG. 1 illustrates an example of a media content access system 100, according to one exemplary embodiment. Media content access system 100 may take many different forms and include multiple and/or alternate components and facilities.

As shown in FIG. 1, a media content processing subsystem 110 is configured to communicate with and receive a signal or data stream (e.g., a media content stream) containing a media content instance from a media content provider 111. The media content processing subsystem 110 and media content provider 111 may communicate using any known communication technologies, devices, media, and protocols supportive of remote data communications, including, but not limited to, cable networks, subscriber television networks, satellite networks, the Internet, intranets, local area networks, wireless networks (e.g., mobile telephone networks), optical fiber networks, data transmission media, communications devices, Transmission Control Protocol ("TCP"), Internet Protocol ("IP"), File Transfer Protocol ("FTP"), telnet, Hypertext Transfer Protocol ("HTTP"), socket connections, Ethernet, and other suitable communications networks and technologies.

The media content processing subsystem 110 may use any suitable technology or technologies to receive the media content instance from the media content provider 111, including using a tuner to receive the media content instance, as described below. The media content processing subsystem 110 may be configured to process the media content stream provided by the media content provider 111, including causing the media content instance, or one or more components (e.g., video and/or audio components) of the media content instance, to be presented for experiencing (e.g., viewing) by a user. The presentation of the media content instance may include, but is not limited to, displaying, playing back, or otherwise processing the media content instance, or one or more components of the media content instance, such that it may be experienced by the user. For example, the media content processing subsystem 110 may provide a signal to a display device 112 (e.g., a television, computer monitor, etc.) so that the display device 112 may present (e.g., display) the media content instance for experiencing by the user.

As shown in FIG. 1, and as will be described in more detail below, the media content processing subsystem 110 may be controlled by a user input device 113 (e.g., a remote control device) and/or a number of additional access devices 114 (e.g., a personal computer, wireless device, mobile phone, etc.).

While an exemplary media content access system 100 is shown in FIG. 1, the exemplary components illustrated in FIG. 1 are not intended to be limiting. Indeed, additional or alternative components and/or implementations may be used, as is well known. Each of the components of system 100 will now be described in additional detail.

A. Media Content Provider

Media content provider 111 is configured to provide various types of media content via a satellite, cable system, subscriber television network, the Internet, optical fiber network, wireless network, or any other suitable network. The media content may include, but is not limited to audio-visual content (e.g., broadcast television programs, pay-per-view services, Internet Protocol Television ("IPTV"), Digital Video Disc ("DVD") related content, or video-on-demand programming), pre-recorded media content, data communication services such as Internet services, images, and audio programming.

Figure 2:
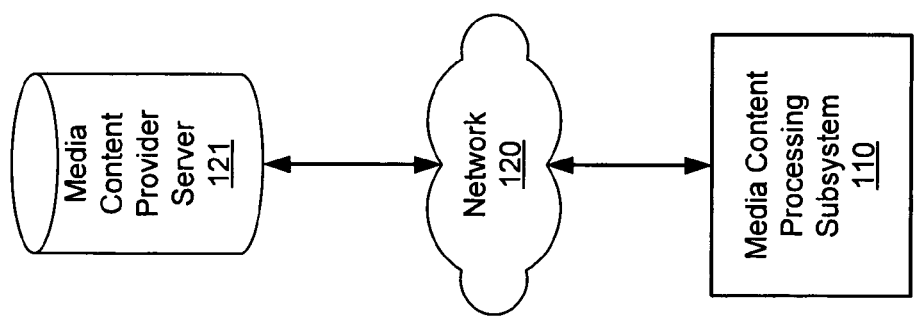
FIG. 2 is an illustration of an exemplary media content provider network, according to an embodiment.

An exemplary media content provider 111 includes a media content provider server 121, as shown in FIG. 2. The media content provider server 121 may be configured to communicate with the media content processing subsystem 110 via one or more types of networks 120 (and communications links thereto). The network 120 shown in FIG. 2 may include the Internet, an intranet or other private packet-switched network, a cable television network (e.g., hybrid fiber-coax network), a wireless broadcast network (e.g., a satellite media broadcasting network or terrestrial broadcasting network), a telephone network, a provider-specific network (e.g., a Verizon® FIOS® network and/or a TiVo® network), an optical fiber network, or any other suitable network. In some alternative examples, the processing subsystem 110 may be connected directly to the media content provider server 121.

B. Display Device

As mentioned, the processing subsystem 110 may be coupled to a display device 112 configured to present media content to a user. For example, the display device 112 may display or play the media content. The display device 112 may include, but is not limited to, a television, computer monitor, mobile phone, handheld device, or any other device configured to present media content to a user.

C. Media Content Processing Subsystem

Figure 3:
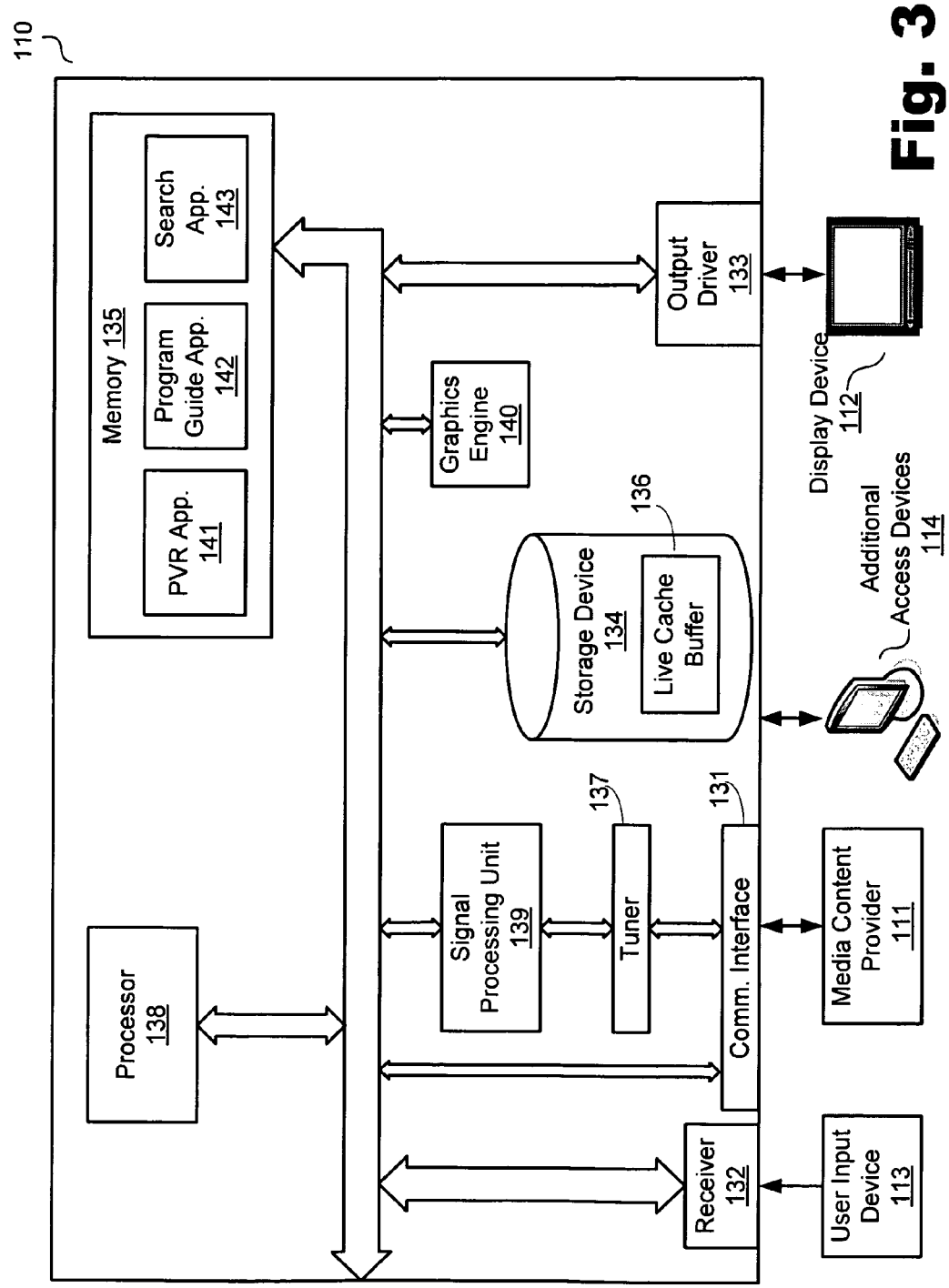
FIG. 3 is a block diagram of an exemplary media content processing subsystem, according to an embodiment.

FIG. 3 is a block diagram of an exemplary media content processing subsystem 110 (or simply "processing subsystem 110") according to an exemplary embodiment. The processing subsystem 110 may include any combination of hardware, software, and firmware configured to process an incoming media content stream. As used herein and in the appended claims, unless otherwise specifically denoted, the terms "media content processing subsystem" and "processing subsystem" will be used to refer expansively to all possible receivers that receive and process digital and/or analog media content. Hence, an exemplary processing subsystem 110 may include, but is not limited to, a set-top box ("STB"), home communication terminal ("HCT"), digital home communication terminal ("DHCT"), stand-alone personal video recorder ("PVR"), DVD player, video-enabled phone, and personal computer.

In certain embodiments, the processing subsystem 110 may include any computer hardware and/or instructions (e.g., software programs), or combinations of software and hardware, configured to perform the processes described herein. In particular, it should be understood that processing subsystem 110 may be implemented on one physical computing device or may be implemented on more than one physical computing device. Accordingly, processing subsystem 110 may include any one of a number of well known computing devices, and may employ any of a number of well known computer operating systems, including, but by no means limited to, known versions and/or varieties of the Microsoft Windows® operating system, the UNIX operating system, Macintosh® operating system, and the Linux® operating system.

Accordingly, the processes described herein may be implemented at least in part as instructions executable by one or more computing devices. In general, a processor (e.g., a microprocessor) receives instructions, e.g., from a memory, a computer-readable medium, etc., and executes those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary processing subsystem 110 is shown in FIG. 3, the exemplary components illustrated in FIG. 3 are not intended to be limiting. Indeed, additional or alternative components and/or implementations may be used. Various components of the processing subsystem 110 will now be described in additional detail.

1. Communication Interfaces

As shown in FIG. 3, the processing subsystem 110 may include a communication interface 131 configured to receive media content in any format from the media content provider 111 or from any other suitable media content source. The communication interface 131 may include any device, logic, and/or other technologies suitable for receiving signals and/or data representative of media content. In certain embodiments, the communication interface 131 may include a single port configured to receive media content from the media content provider 111 and/or from any other source (e.g., from another processing subsystem, another server, etc.) For example, the communication interface 131 may include or be connected to a broadband connection, which can enable the processing subsystem 110 to receive media content on a single port from multiple sources. In other embodiments, multiple ports may be used. The communication interface 131 may be configured to interface with any suitable communication media, protocols, and formats, including any of those mentioned above.

The processing subsystem 110 may also include a receiver 132 configured to receive input commands from a user input device 113. The user input device 113 may include, for example, a remote control, keyboard, or any other suitable input device and may be configured to communicate with the receiver 132 via a wireless link, electrical connection, or any other suitable communication link.

Figure 4:
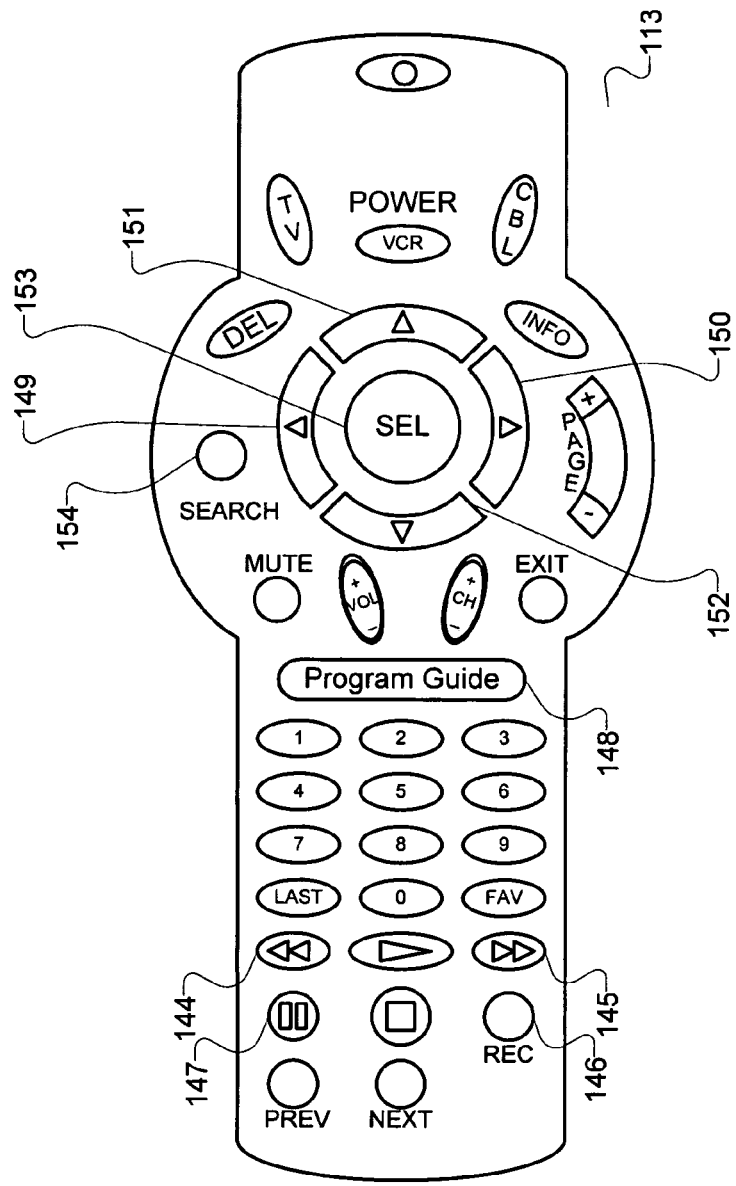
FIG. 4 illustrates an exemplary remote control user input device, according to an embodiment.

An exemplary remote control user input device 113 is illustrated in FIG. 4. In some examples, the input device 113 may be configured to enable a user to control viewing options of the media content. For example, rewind 144 and fast-forward buttons 145 enable a user to access different scenes or frames within media content stored in a live cache buffer 136. A record button 146 may also be included which enables the user to designate as permanently recorded any media content instance buffered in the live cache buffer 136. A pause button 147 may enable the user to pause a media content instance. A program guide button 148, as will be described in more detail below, may be configured to evoke the display of a program guide on the display device 112. A left button 149, right button 150, up button 151, down button 152, and select button 153 may be included and configured to enable the user to evoke and/or navigate through various views and graphical user interfaces displayed by the display device 112. Furthermore, as will be described in more detail below, the remote control user input device 113 may include a search button 154 configured to allow a user to search for one or more media content instances.

It will be recognized that the input device 113 shown in FIG. 4 is merely illustrative of the many different types of user input devices that may be used in connection with the present systems and methods.

Returning to FIG. 3, a number of additional access devices 114 may also be configured to communicate with the processing subsystem 110. These access devices 114 may include, but are not limited to, personal computers and mobile devices (e.g., laptops, PDAs, cellular phones, etc.). In some examples, as will be described in more detail below, the access devices 114 may be configured to access content stored and/or processed by the processing subsystem 110. For example, media content that has been recorded by the processing subsystem 110 may be accessed and viewed on a personal computer. Moreover, the additional access devices 114 may be used to program or otherwise control the functions of the processing subsystem 110.

The processing subsystem 110 may also include an output driver 133 configured to interface with or drive the display device 112. The output driver 133 may include any combination of hardware, software, and firmware as may serve a particular application.

2. Storage Devices

Storage device 134 may include one or more data storage media, devices, or configurations and may employ any type, form, and combination of storage media. For example, the storage device 134 may include, but is not limited to, a hard drive, network drive, flash drive, magnetic disc, optical disc, or other non-volatile storage unit. Various portions of media content may be temporarily and/or permanently stored in the storage device 134.

The storage device 134 of FIG. 3 is shown to be a part of the processing subsystem 110 for illustrative purposes only. It will be understood that the storage device 134 may additionally or alternatively be located external to the processing subsystem 110.

The processing subsystem may also include memory 135. Memory 135 may include, but is not limited to, FLASH memory, random access memory (RAM), dynamic RAM (DRAM), or a combination thereof. In some examples, as will be described in more detail below, various applications (e.g., a program guide application) used by the processing subsystem 110 may reside in memory 135.

As shown in FIG. 3, the storage device 134 may include one or more live cache buffers 136. The live cache buffer 136 may additionally or alternatively reside in memory 135 or in a storage device external to the processing subsystem 110. In some examples, media content data may be temporarily stored in the live cache buffer 136 to facilitate viewing of the media content in one or more trick play modes.

3. Tuner

Tuner 137 is configured to tune to a particular television channel, stream, address, frequency or other carrier (i.e., content carrier) in order to process media content that is transmitted on that carrier. In some examples, the tuner 137 may include multiple tuners such that multiple carriers of media content may be processed and/or shown on a display device 112. For example, the tuner 137 may include a first tuner configured to receive an analog video signal corresponding to a first media content instance and a second tuner configured to simultaneously receive a digital compressed stream corresponding to a second media content instance. It will be recognized that the tuner 137 may have any number of tuners configured to receive any kind of media content.

In some examples, media content received at the tuner 137 is temporarily buffered, or stored, in the live cache buffer 136. If there are multiple tuners 137, there may be a live cache buffer 136 corresponding to each of the tuners 137. Once media content is temporarily stored in the live cache buffer 136, the user may then designate whether the media content is to be permanently stored as a permanent recording in the storage device 134 or whether the media content is to be deleted. As used herein, the term "permanent recording" will be understood to mean media content that is stored for an extended period of time as decided by the user.

4. Processors

As shown in FIG. 3, the processing subsystem 110 may include one or more processors, such as processor 138 configured to control the operations of the processing subsystem 110. The processing subsystem 110 may also include a signal processing unit 139 configured to process incoming media content. The signal processing unit 139 may be configured, for example, to demodulate and parse encoded digital media content. In some examples, the processing subsystem 110 may include one or more signal processing units 139 corresponding to each of the tuners 137.

In some examples, if the incoming media content is in the form of IP data packets (e.g., in IPTV configurations), the media content may be processed directly by the processor 138 and/or any other processor configured to process IP data packets.

The processing subsystem 110 may also include a graphics engine 140 configured to generate graphics that are to be displayed by the display device 112. The graphics may include graphical user interfaces such as, but not limited to, one or more program guides, progress bars, and other graphics.

5. Application Clients

Returning to FIG. 3, one or more applications 141-143 residing within the processing subsystem 110 may be executed upon initiation by a user of the processing subsystem 110. The applications 141-143, or application clients, may reside in memory 135 or in any other area of the processing subsystem 110 and be executed by the processor 138. The applications 141-143 shown in FIG. 3 are merely illustrative of the many different applications that may reside within the processing subsystem 110.

As shown in FIG. 3, one of the applications may include a personal video recording (PVR) application 141. A PVR application is also referred to as a digital video recording (DVR) application. As used herein, the term "PVR application" will be used to refer to any application or device configured to record media content and/or provide for the viewing of media content in trick play mode. As previously mentioned, trick play modes include, but are not limited to, slow motion, fast motion, reverse play, fast forward play, instant replay, jumping, pausing of live broadcast, and scanning. The PVR application 141 may also provide for media content recording functionality by enabling the temporary and/or permanent recording of media content to the storage device 134.

In some examples, the PVR application 141 may be integrated into the processing subsystem 110, as shown in FIG. 3, or it may be a stand-alone unit. A stand-alone PVR may be coupled to the processing subsystem 110 or it may be used in place of the processing subsystem 110. In the examples contained herein, it will be assumed that the PVR application 141 is integrated into the processing subsystem 110 for illustrative purposes only.

The processing subsystem 110 may additionally or alternatively include a program guide application 142 configured to generate a program guide that is displayed on the display device 112. An exemplary program guide includes a GUI that performs various functions including allowing a user to select and/or view information and options associated with various media content instances.

In some examples, the processing subsystem 110 includes a search application 143 configured to enable a user to search for a particular media content instance and/or information related to one or more media content instances. The search application 143 will be described in more detail below.

Figure 5:
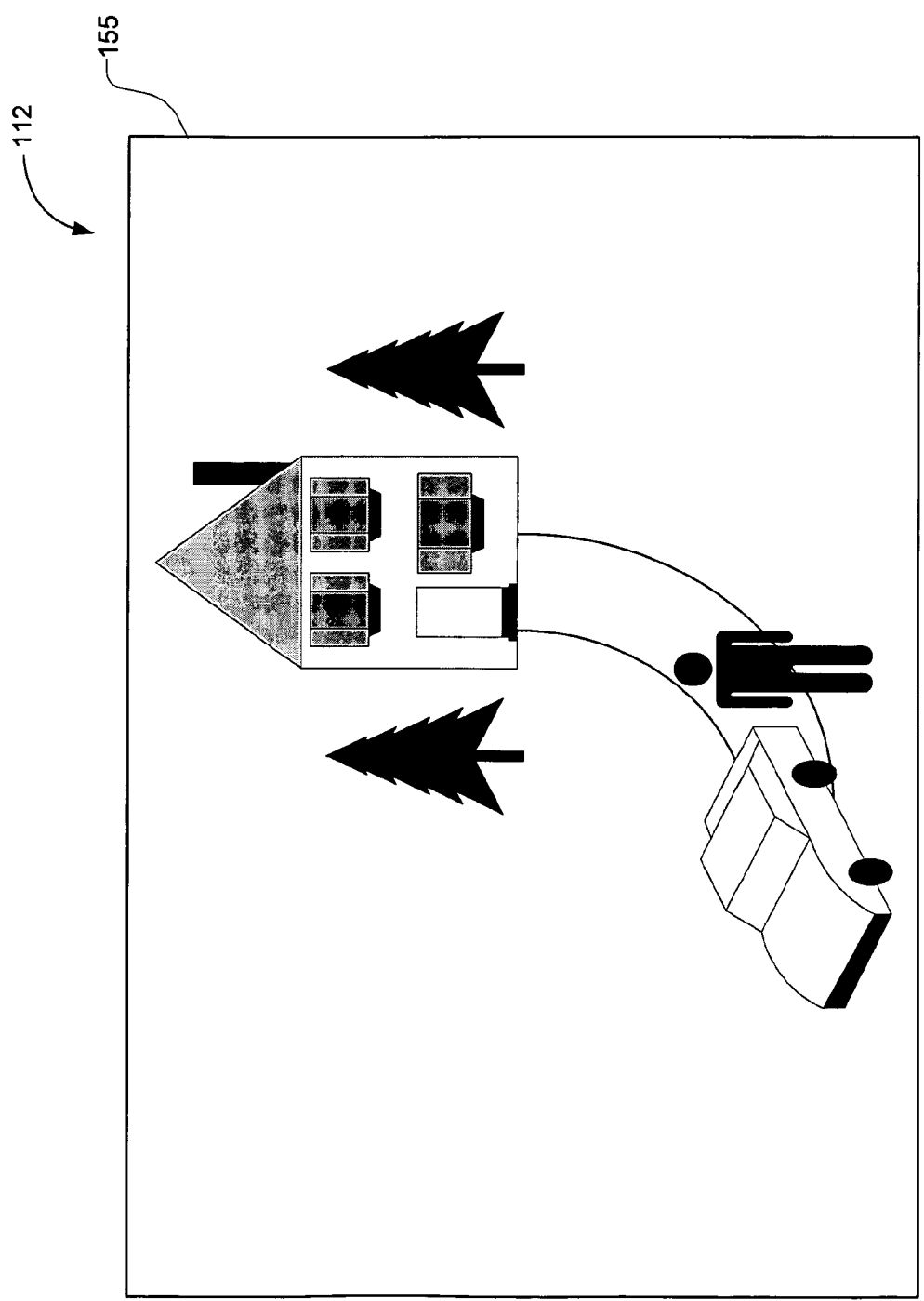
FIG. 5 illustrates a viewing screen of an exemplary display device with a particular scene or frame of media content displayed thereon, according to an embodiment.

To facilitate an understanding of the search application 143, FIGS. 5-17 illustrate various embodiments of views caused to be displayed on the display device 112 by the processing subsystem 110. An exemplary media content scene is shown in FIG. 5. FIG. 5 illustrates a viewing area or screen 155 of an exemplary display device 112 with a particular scene or frame of a media content instance displayed thereon. In some examples, the user may be interested in experiencing a different media content instance and/or viewing information related to one or more other media content instances.

However, there may be a relatively large number (e.g., thousands) of media content instances available via the processing subsystem 110 at the same time that the media content instance shown in FIG. 5 is being displayed. Furthermore, there may be many media content instances available via the processing subsystem 110 at any given time in the future in relation to the media content instance currently being displayed in FIG. 5.

Figure 6:
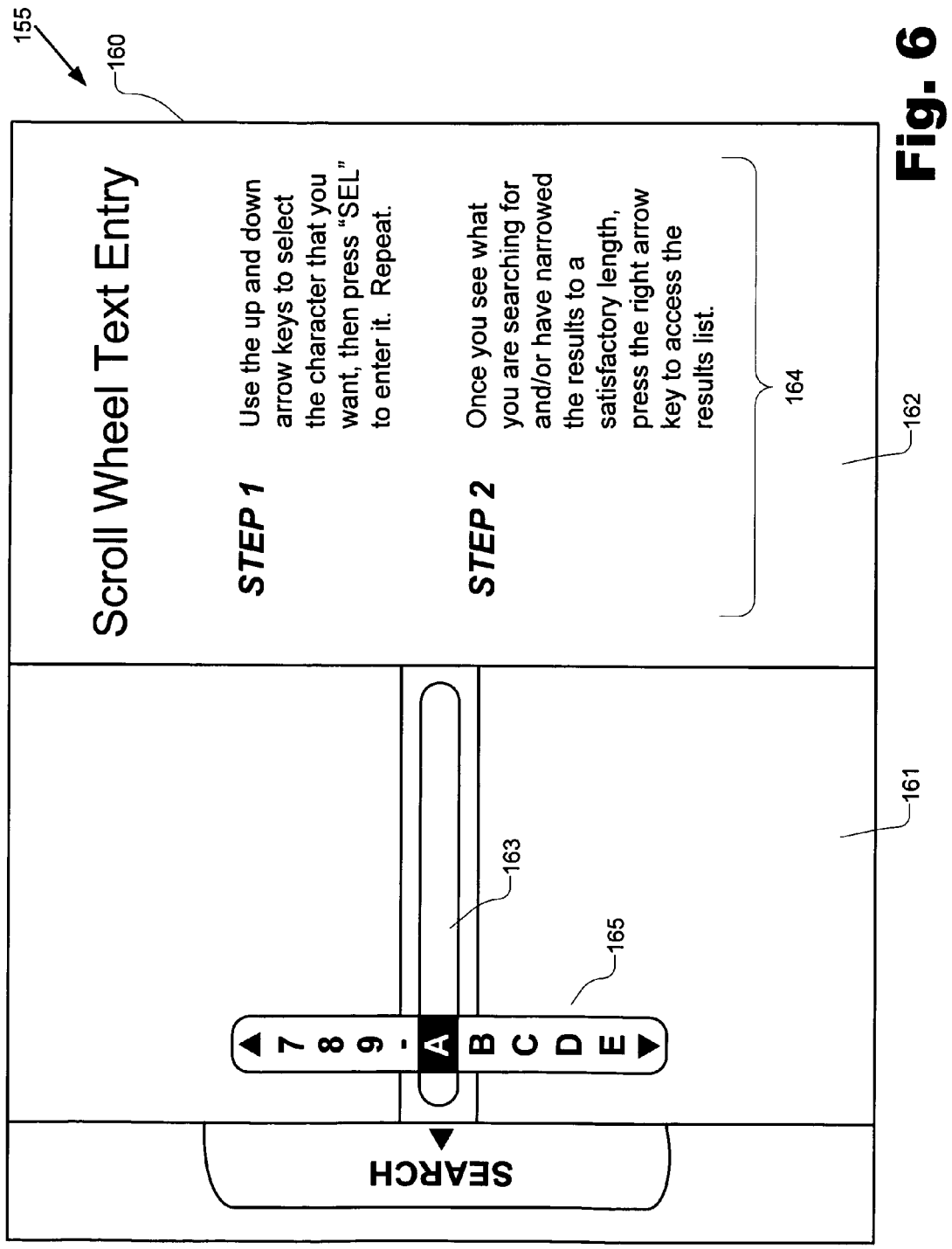
FIG. 6 illustrates an exemplary search graphical user interface ("GUI"), according to an embodiment.

Hence, the systems and methods described herein may be used to allow a user to rapidly search for and browse through information related to one or more media content instances. FIG. 6 illustrates an exemplary search GUI 160 that may be displayed by the display device 112. The search GUI 160 may be evoked using a number of different methods. For example, the user may press a dedicated button on a user input device (e.g., the search button 154 on the remote control user input device 113). Additionally or alternatively, the search GUI 160 may be evoked by selecting an option within a program guide GUI or within any other GUI as may serve a particular application.

The search GUI 160 of FIG. 6 occupies substantially the entire viewing screen 155 of the display device 112. However, it will be recognized that the search GUI 160 may alternatively occupy only a portion of the viewing screen 155.

As shown in FIG. 6, the search GUI 160 may include at least two interactive viewing panes, labeled 161 and 162 respectively. In some examples, as will be described in more detail below, the user may enter one or more search terms into a character entry field 163 located within the first viewing pane 161. The contents of the second viewing pane 162 are dynamically updated to include real-time search results as each character is entered into the character entry field 163 by the user.

The search GUI 160 may initially display instructions 164 within one or more of the viewing panes (e.g., the second viewing pane 162 as shown in FIG. 6). The instructions 164 may describe one or more steps involved with using the search GUI 160. It will be recognized that the instructions 164 may vary as may serve a particular application.

As mentioned, the first viewing pane 161 may include a character entry field 163 into which a user may input one or more search terms. The user may search by keyword, subject, actor, genre, or any other type of search criteria. However, for illustrative purposes only, it will be assumed in the examples given herein that the user is searching by keyword.

A number of different character (e.g., alpha-numeric) entry methods may be used to input characters into the character entry field 163. For example, as shown in FIG. 6, a "scrolling character wheel" 165 may be provided. The scrolling character wheel 165 shown in FIG. 6 is vertically aligned for illustrative purposes only. In some alternative embodiments, the scrolling character wheel 165 may be horizontally aligned.

To input characters using the scrolling character wheel 165, a user may, for example, use the up and down arrow keys 151 and 152 of user input device 113 (shown in FIG. 4) to highlight a desired character. For example, as shown in FIG. 6, the character "A" is highlighted. When the desired character is highlighted, the user may press the select button 153 to enter the selected character into the character entry field 163. This process may be repeated to enter subsequent characters into the character entry field 163.

Figure 7:
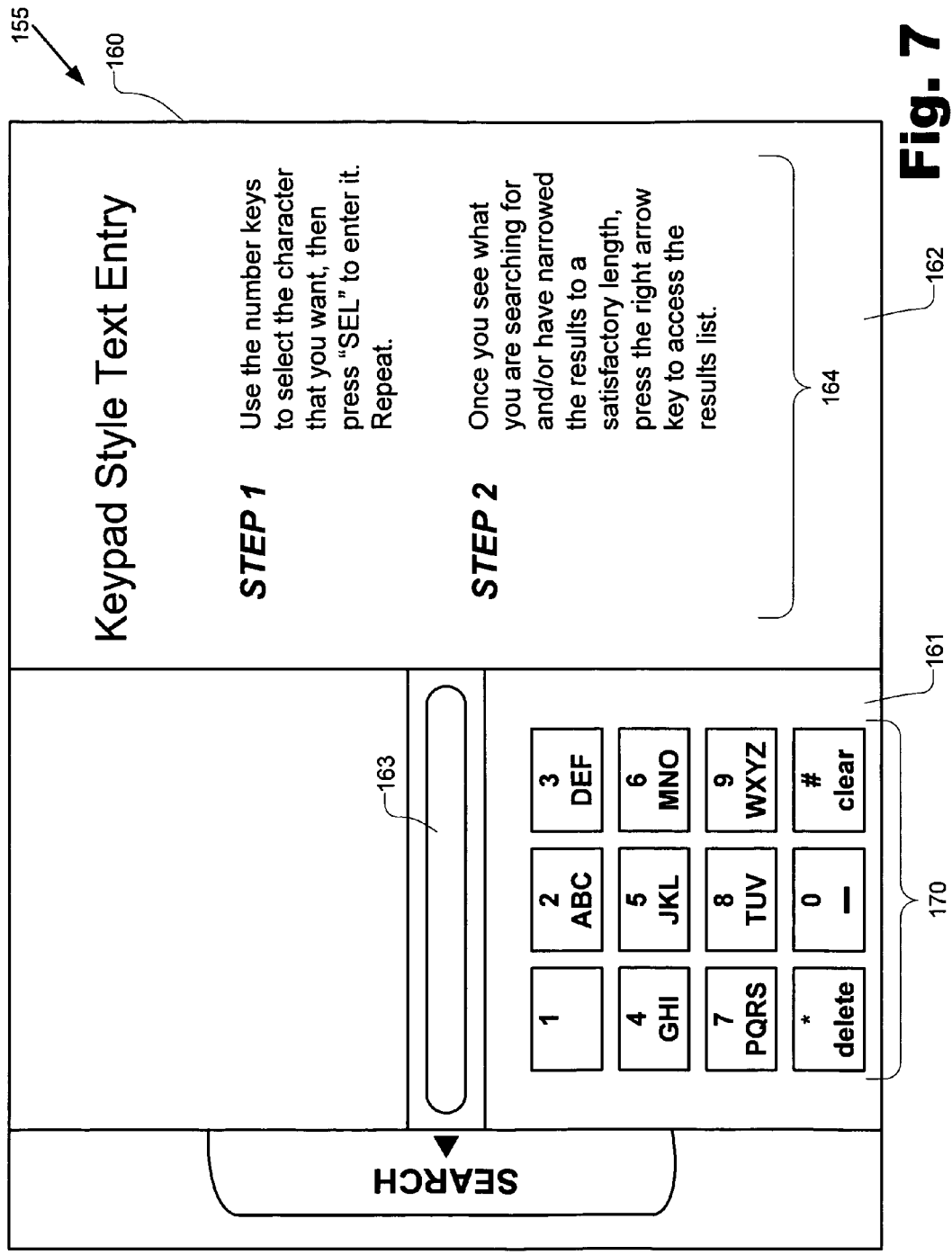
FIG. 7 shows the exemplary search GUI with an interactive keypad displayed therein, according to an embodiment.

Another exemplary means of entering one or more search terms into the character entry field 163 is illustrated in FIG. 7. FIG. 7 shows the exemplary search GUI 160 with an interactive keypad 170 displayed therein. The interactive keypad 170 may be used in a manner similar to cell phone text messaging to populate the character entry field 163 with one or more characters. For example, the user may select the digit "3" two times to input the letter "E" into the character entry field 163. Additionally or alternatively, the characters may be included on the number keys of the remote control input device 113 and the user may enter one or more characters into the character entry field 163 using any suitable method.

It will be assumed that a scrolling character wheel 165 is used to enter characters into the character entry field 163 in the remaining examples given herein. However, it will be recognized that the user may use any mechanism for entering one or more characters into the character entry field 163 as may serve a particular application.

Figure 8:
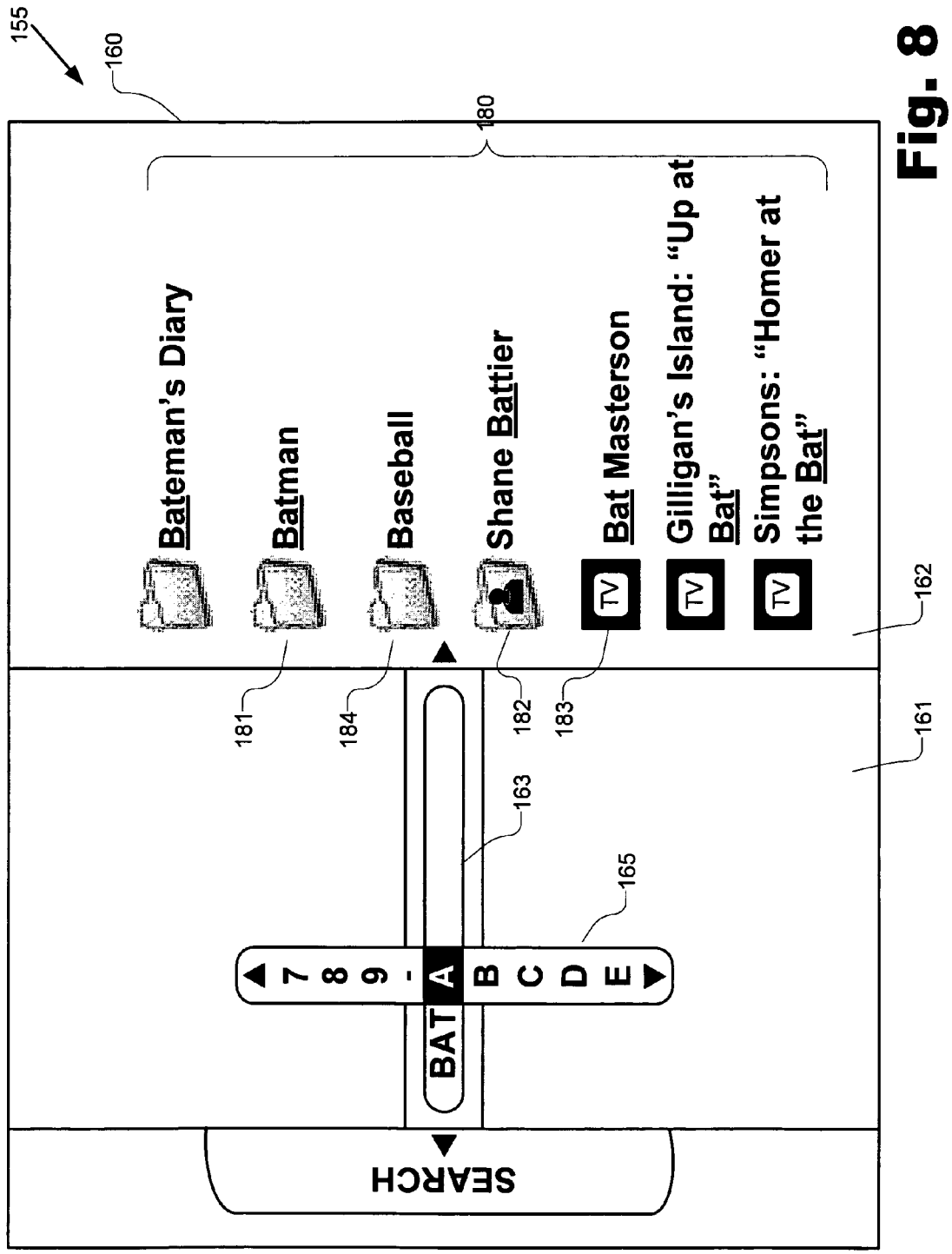
FIG. 8 shows the search GUI after the user has entered a number of characters into a character entry field, according to an embodiment.

FIG. 8 shows the search GUI 160 after the user has entered a number of characters into the character entry field 163. As shown in FIG. 8, the instructions 164 have disappeared from the second viewing pane 162 and have been replaced by a search results list 180. In some examples, the instructions 164 disappear when the user begins entering characters into the character entry field 163. Alternatively, the instructions 164 may be configured to disappear after a user-definable amount of time.

As shown in FIG. 8, the characters "BAT" have been entered into the character entry field 163. Hence, each of the entries within the search results list 180 includes the character sequence "BAT". However, it will be recognized that one or more of the entries within the search results list 180 may not include the character sequence "BAT" within its respective title, as will be described in more detail below.

In some examples, the search results list 180 is dynamically updated in real-time as a user enters each character into the character entry field 163. For example, the search results list 180 may initially include entries containing the character "B" after the user has entered "B" into the character entry field 163. When the user enters the next character "A" into the character entry field 163, the list is dynamically updated or narrowed to include entries containing the character sequence "BA". This process is repeated until the search results list 180 is narrowed to a satisfactory length.

The entries within the search results list 180 may be of varying type. For example, the search results list 180 may include one or more folders that include a number of related media content instances and/or information associated with one or more media content instances (e.g., the folder labeled "Batman" 181), one or more names of actors or other persons associated with one or more media content instances (e.g., the category labeled "Shane Battier" 182), and/or one or more titles of a specific media content instances (e.g., the television program "Bat Masterson" 183). It will be recognized that the search results list 180 may include any other type of entry as may serve a particular application.

As mentioned, one or more of the entries within the search results list 180 may not include the character sequence (e.g., "BAT") that has been entered into the character entry field 163 within its respective title. For example, the folder labeled "Baseball" 184 does not include the character sequence "BAT" within its title. However, the baseball folder 184 may include one or more media content instances that have "BAT" within their titles and/or may have a keyword, tag, or other identifier with the character sequence "BAT" contained therein.

Once the search results list 180 has been narrowed to a satisfactory length, the user may arrow over to the second viewing pane 162 to browse through the search results list 180. The user may select (e.g., using button 153 as shown in FIG. 4) one of the entries within the search results list 180 to access further information related to that entry. For example, FIG. 9 shows the search GUI 160 after the Batman folder 181 has been selected.

Figure 9:
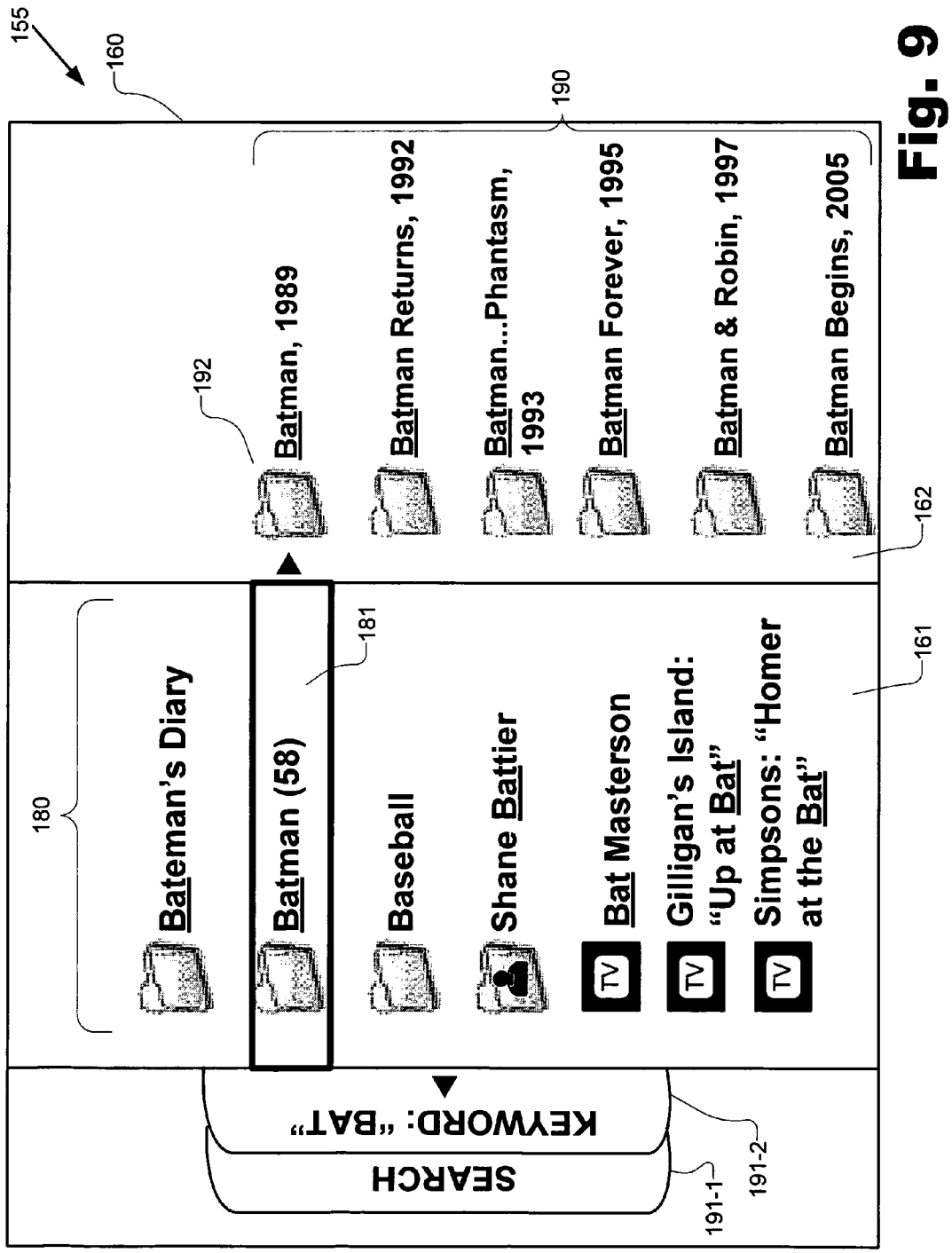
FIG. 9 shows the search GUI after a particular entry within a search results list has been selected, according to an embodiment.

As shown in FIG. 9, once the Batman folder 181 has been selected, the search results list 180 is transferred to the first viewing pane 161 and a list 190 of the content contained within the selected folder 181 is displayed in the second viewing plane 162. The content list 190 shown in FIG. 9 may include any number of folders and/or media content instances associated with the selected folder 181. For example, the content list 190 includes a number of folders each corresponding to a particular Batman movie. The contents of the folders within the list 190 will be described in more detail below.

In some examples, a number of search history tabs (e.g., 191-1 or 191-2, collectively referred to herein as 191) may be included within the search GUI 160. The search history tabs 191 may be vertically oriented along the left-hand side of the viewing screen 155, as shown in FIG. 9. Additionally or alternatively, the search history tabs 191 may be located and/or oriented in any other suitable manner.

The search history tabs 191 are configured to graphically display search levels within a search path or thread taken by a user during a particular search session. Each tab 191 may be selectable and may be labeled so that the user can easily go back to a search level within the search thread and choose a different search path without having to start the search over from the beginning.

For example, the first or left-most tab 191-1 corresponds to a first level within the search path or thread shown in FIG. 9. Hence, the user may select the first tab 191-1 to return to an original search menu where he or she may select a particular method of search (e.g., by keyword). The second tab 191-2 corresponds to a second search level shown in FIG. 9 (i.e., the keyword search "BAT" shown in FIG. 8). Hence, the user may select the second tab 191-2 to return to the screen shown in FIG. 8 wherein the search results list 180 in the second viewing pane 162 includes entries with the character sequence "BAT". The search history tabs 191 will be described in more detail below.

Once the Batman folder 181 has been selected, the user may either browse through the content list 190 and select a desired entry contained therein or refine the search by entering a new search term. Both of these operations will be described in more detail below. The user may alternatively perform any other function as may serve a particular application.

Figure 10:
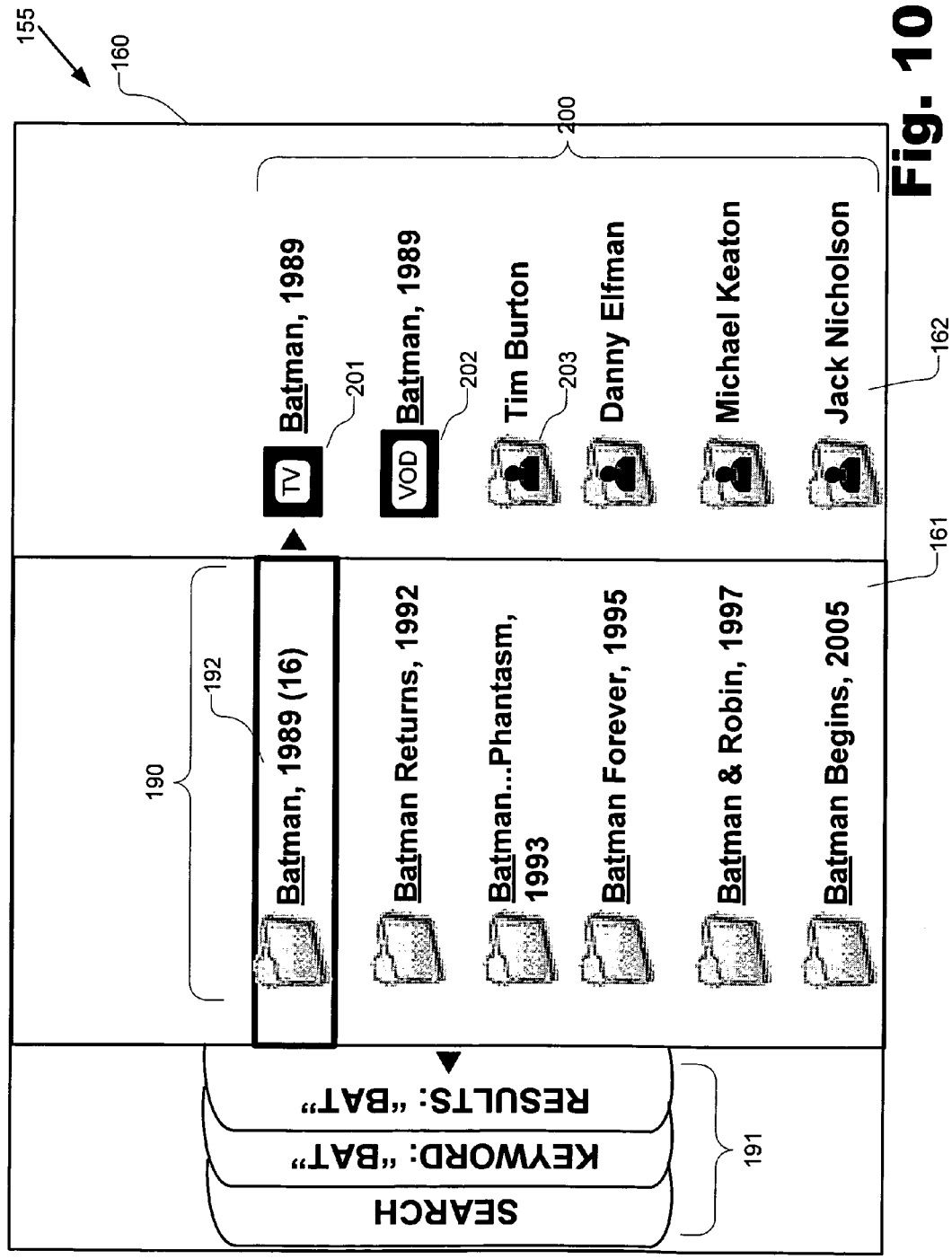
FIG. 10 shows another exemplary view of the search GUI, according to an embodiment.

As mentioned, the user may browse through the content list 190 of FIG. 9 and select a desired entry contained therein. For example, the user may arrow over and select folder 192 labeled "Batman, 1989". FIG. 10 shows the search GUI 160 after folder 192 has been selected.

As shown in FIG. 10, once folder 192 has been selected, the content list 180 shifts to being displayed in the first viewing pane 161 and a list 200 of the content contained within the selected folder 192 is displayed in the second viewing plane 162. The content list 200 shown in FIG. 10 may include any number of folders and/or media content instances associated with "Batman, 1989". For example, the content list 200 includes an instance 201 of Batman that is to be broadcast via a particular television channel, an instance 202 of Batman that is available via video-on-demand, and a number of folders containing information associated with various actors, directors, producers, and/or other persons associated with "Batman, 1989" (e.g., the folder 203 entitled "Tim Burton").

Figure 11:
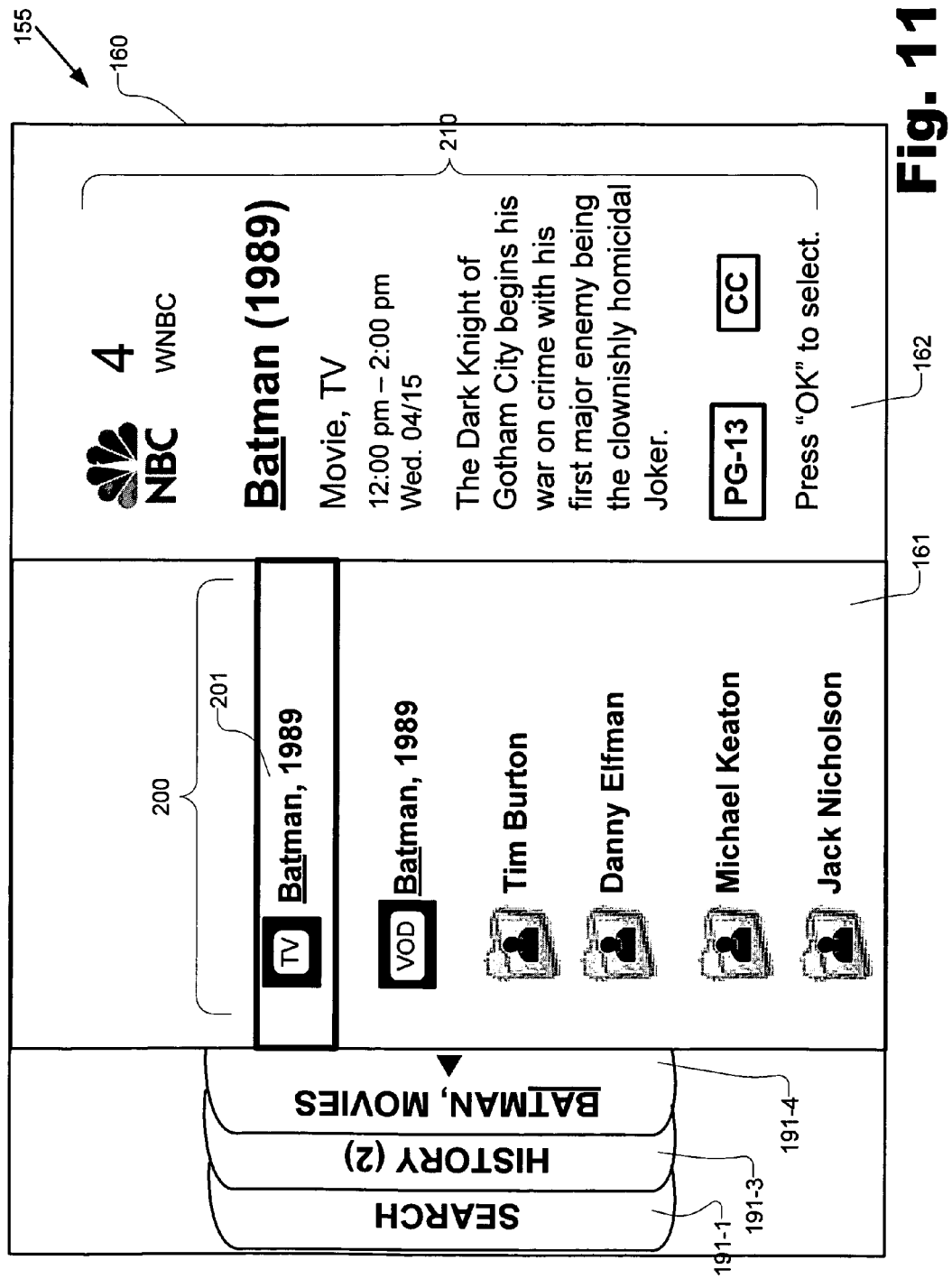
FIG. 11 shows an exemplary view of the search GUI with an expandable search history tab, according to an embodiment.

The user may then arrow over and select one of the entries within the content list 200 to access additional information corresponding therewith. For example, the user may select the television entry 201 to access program information associated with the entry 201. FIG. 11 shows the search GUI 160 after the television entry 201 has been selected.

As shown in FIG. 11, the content list 200 has been shifted to being displayed in the first viewing pane 161 and program information 210 corresponding to the selected entry 201 is displayed in the second viewing pane 162. The program information 210 may include any type of information corresponding to the selected entry 201 including, but not limited to, the title of the selected media content instance, a summary of the selected media content instance, the broadcast time, the broadcast channel, and/or one or more options corresponding to the selected media content instance (e.g., recording, playback, parental control, and/or other types of options). For example, the program information 210 shown in FIG. 11 shows that the selected Batman media content instance is a movie and that it will be broadcast on WNBC, channel 4, on Wednesday, April 15, from 12:00 p.m. to 2:00 p.m. The program information 210 shown in FIG. 11 further includes a summary and parental rating for the Batman movie.

FIG. 11 also illustrates an exemplary embodiment wherein one of the search history tabs is an expandable search history tab (e.g., tab 191-3). It will be recognized that as a user goes deeper into a search thread, the screen space required to display the corresponding search history tabs 191 increases. Hence, after a certain number of tabs 191 are displayed, it becomes infeasible to display more tabs 191 without encroaching on the screen space needed for the first and second viewing panes 161 and 162. In such a situation, in one approach, the nature of the tabs may be changed (e.g., placed in a linear staggered manner using available vertical space adjacent the current placement of tabs 191-1, 191-2 and 191-3).

In some examples, an expandable search history tab 191-3 may be displayed after a pre-determined number of search history tabs 191 are displayed. The expandable search history tab 191-3 graphically represents a plurality of hidden search history tabs that cannot be displayed because of space limitations. The hidden search history tabs represent one or more search levels within a search thread.

To access one or more of the hidden search history tabs, a user may select the expandable search history tab 191-3. When selected, the expandable search history tab 191-3 is configured to expand and show a number of the hidden search history tabs. The user may then select one of the hidden search history tabs to return to a search screen corresponding to the selected tab.

Figure 12:
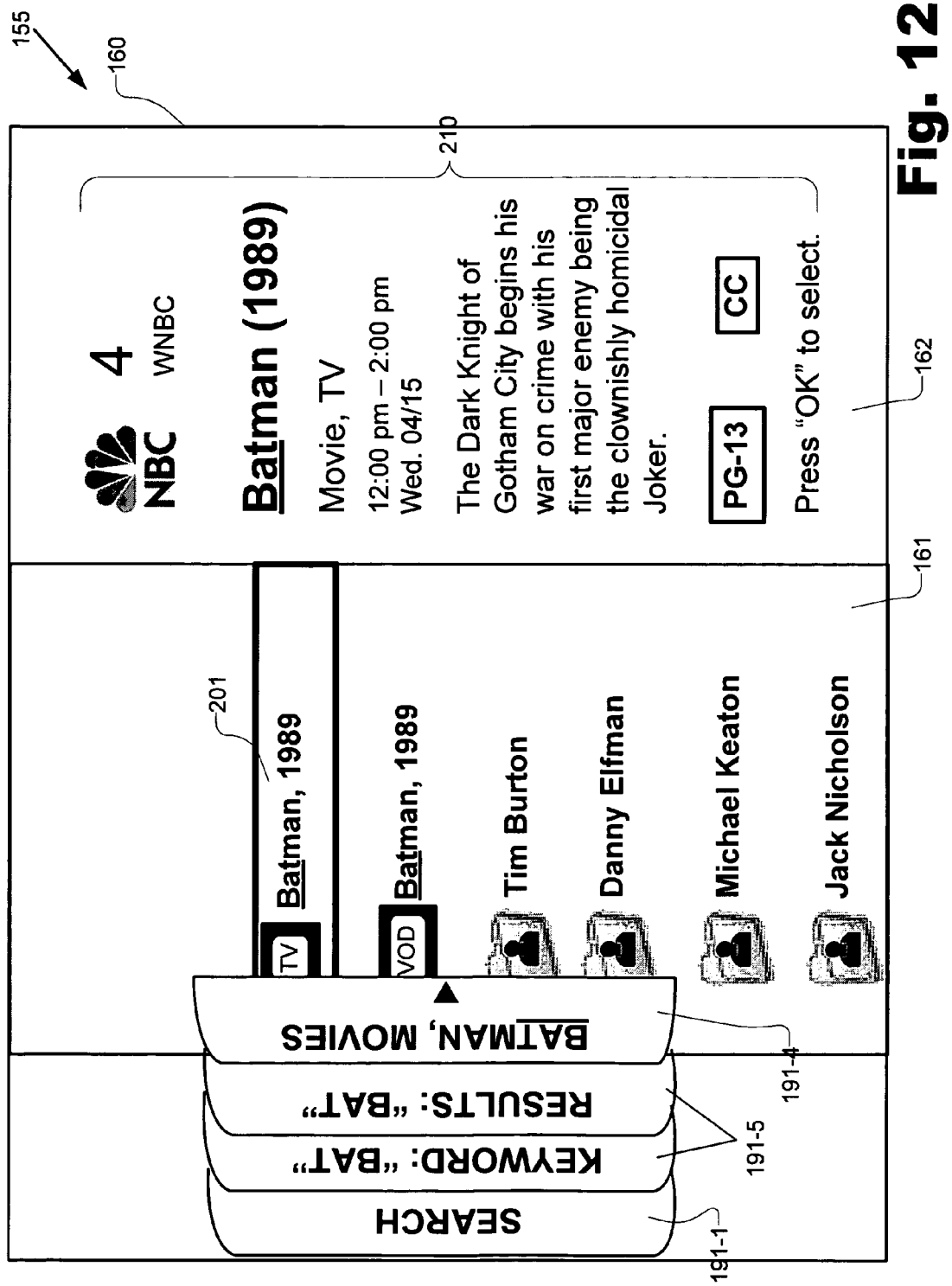
FIG. 12 shows the search GUI after the expandable search history tab of FIG. 11 has been expanded, according to an embodiment.

For example, the expandable search history tab 191-3 shown in FIG. 11 indicates that two search tabs are currently hidden from view. A user may select the expandable search history tab 191-3 to view the hidden search tabs. FIG. 12 shows the search GUI 160 after the expandable search history tab 191-3 of FIG. 11 has been expanded. The two search history tabs 191-5 correspond to the search levels shown in FIGS. 8 and 9 respectively.

As shown in FIG. 12, the search history tabs 191 may at least partially overlap with the first and/or second viewing panes 161 and 162 when the expandable search history tab 191-3 is expanded. In some examples, the user may select an option to collapse the search history tabs 191-5 back into the expandable search history tab 191-3.

It will be recognized that the number of search history tabs 191 that are displayed before an expandable search history tab 191-3 is displayed may vary as may serve a particular application. In some examples, one of the search history tabs 191 (e.g., the left-most tab) is always the "search" tab 191-1 so that a user may quickly start over with a search session. Additionally or alternatively, one of the search history tabs 191 (e.g., the right-most tab) always corresponds to the previous search level in relation to the current search level. For example, if the current search level corresponds to the search screen shown in FIG. 12, the right-most tab 191-4 corresponds to the search level shown in FIG. 11.

Figure 13:
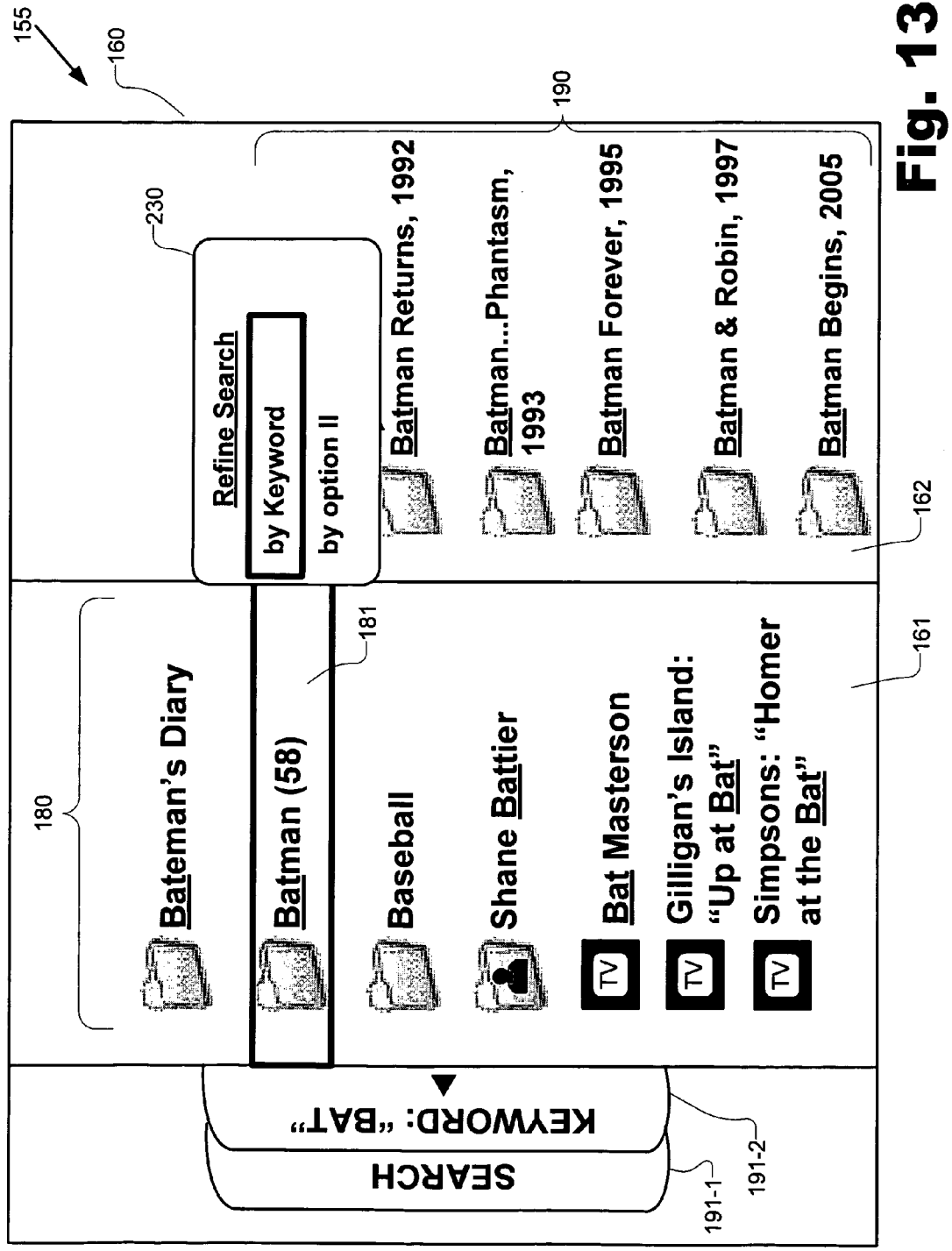
FIG. 13 shows the search GUI after a user has selected an option to narrow a search within a particular folder by entering a new search term, according to an embodiment.

As mentioned, once a particular entry within a content or search results list (e.g., search results list 180) has been selected, the search may be refined or narrowed by entering a new search term. The processing subsystem 110 may then be configured to search for the new search term within content related to the selected entry. For example, FIG. 13 shows the search GUI 160 after the user has selected an option to narrow the search within the Batman folder 181 by entering a new search term. It will be recognized that a user may select the option to narrow the search by entering a new search term using any suitable method such as, but not limited to, pressing a button on the remote control user input device 113.

As shown in FIG. 13, upon selecting the option to narrow the search within the Batman folder 181, a graphic 230 may appear presenting the user with one or more options. For example, the graphic 230 of FIG. 13 presents the user with an option to refine the search entering a new keyword. Additional or alternative options may be presented to the user including, but not limited to, refining the search by genre, year, rating, broadcast time, actor, producer, etc. However, for illustrative purposes only, it will be assumed that the user selects an option to refine the search by entering a new keyword.

Figure 14:
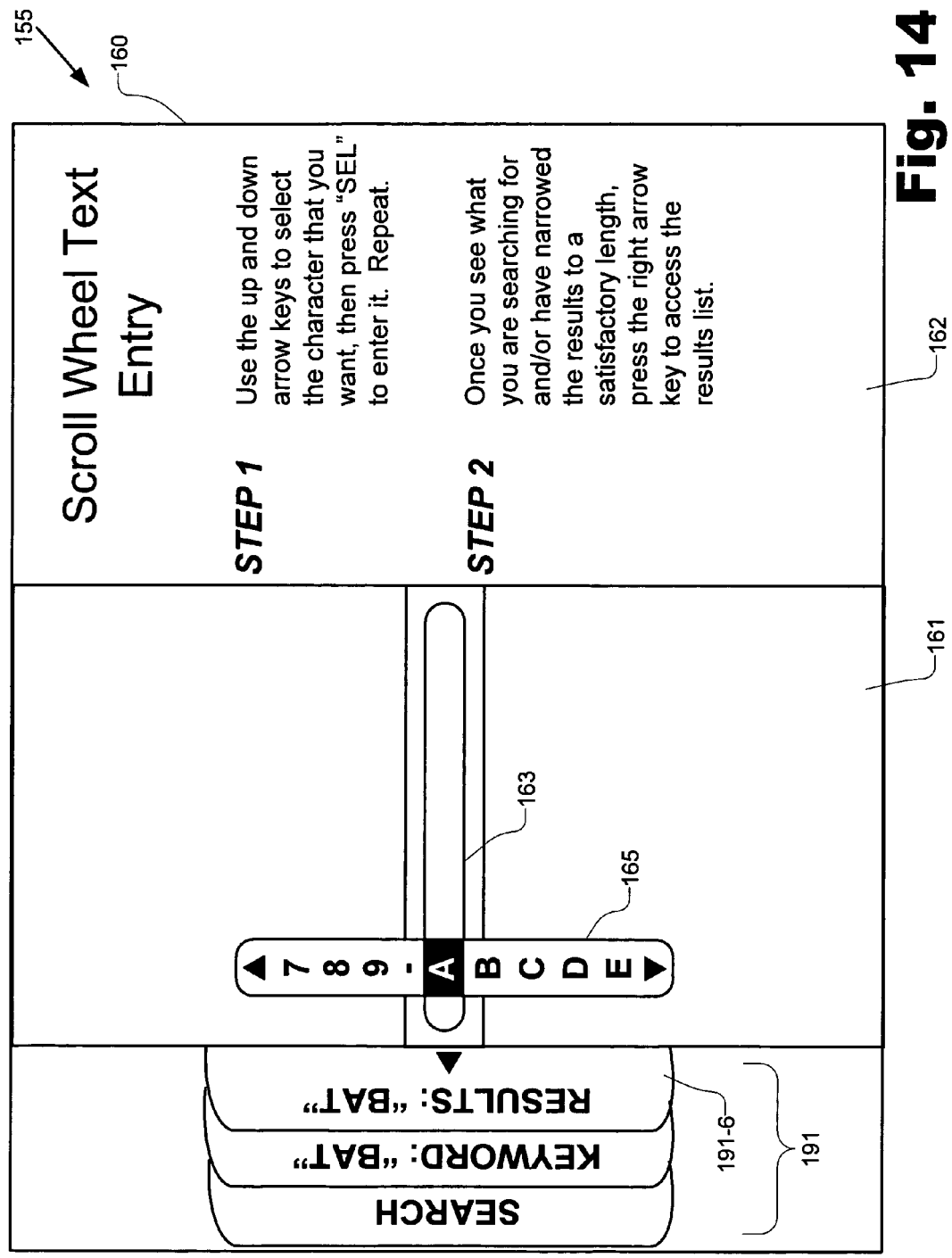
FIG. 14 shows another exemplary view of the search GUI, according to an embodiment.

FIG. 14 shows the search GUI 160 after the user has selected an option to refine the search within the Batman folder 181 by searching for a new keyword contained therein. As shown in FIG. 14, the search screen of FIG. 13 has been collapsed into a search history tab 191-6 and the character entry field 163 is now displayed within the first viewing pane 161. The user may then enter the new keyword into the character entry field 163 and refine the search accordingly.

Instead of narrowing a search thread, a user may desire to expand a search thread without having to start over with the search. For example, a user may be searching for Batman related content, as described in the previous examples, when he or she desires to access information that is related to one of the entries in one of the content lists (e.g., content list 200), but not necessarily related to Batman. Hence, in some embodiments, when the user selects a particular entry within a content list, the resulting content list may include information that is related to the selected entry, but that may or may not be related to the other levels within the search thread.

Figure 15:
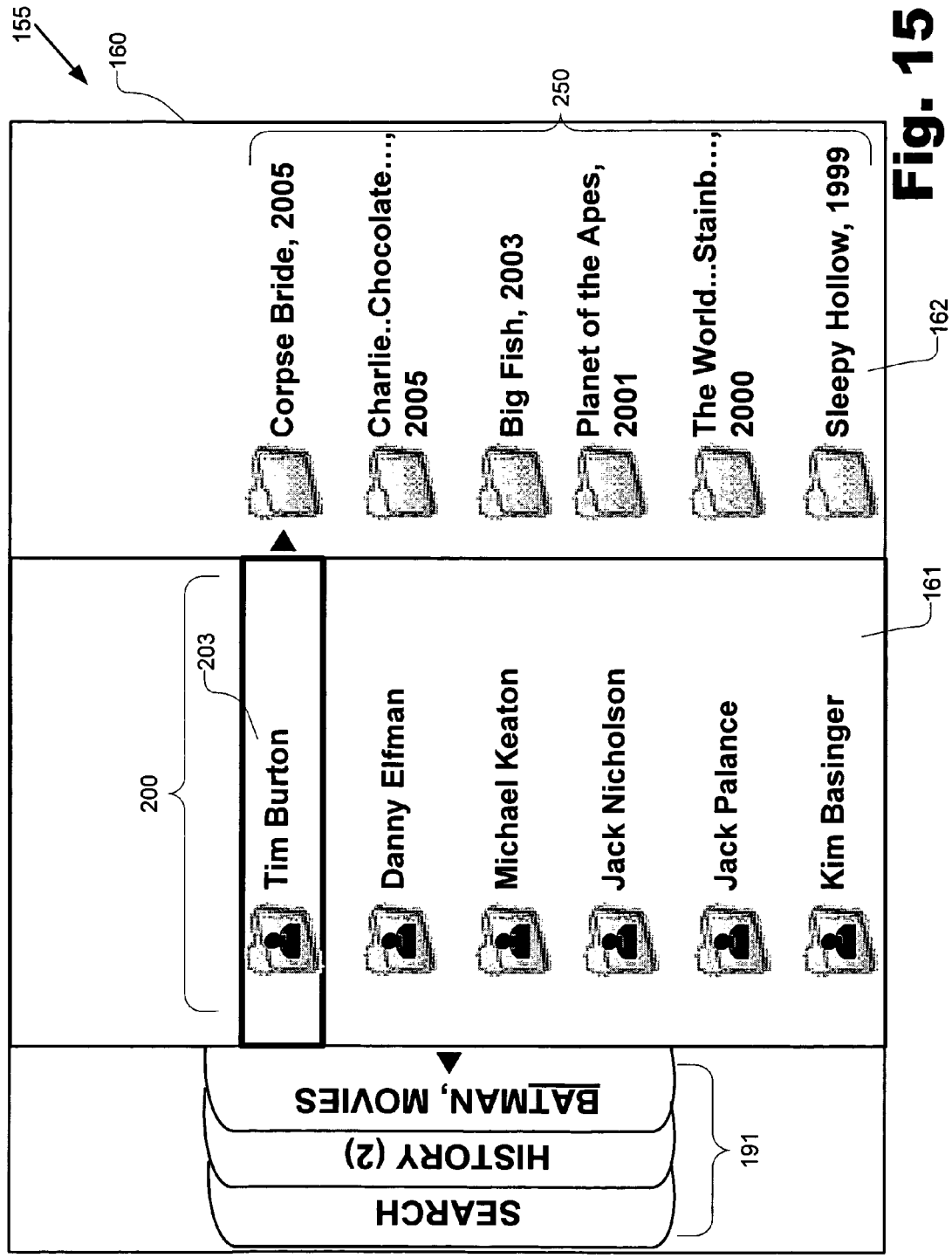
FIG. 15 shows another exemplary view of the search GUI, according to an embodiment.

To illustrate, FIG. 15 shows the search GUI 160 when the folder labeled "Tim Burton" 203 is selected from the content list 200 shown in FIG. 10. As shown in FIG. 15, the content list 200 has been shifted to being displayed in the first viewing pane 161 and a list 250 of content related to Tim Burton 203 is displayed in the second viewing pane 162. As shown in FIG. 15, the content list 250 includes a list of movies that Tim Burton has directed. Hence, the user may select an entry from the content list 250 and browse content contained therein, even though the content may not be related to the original search term (e.g., "BAT").

Figure 16:
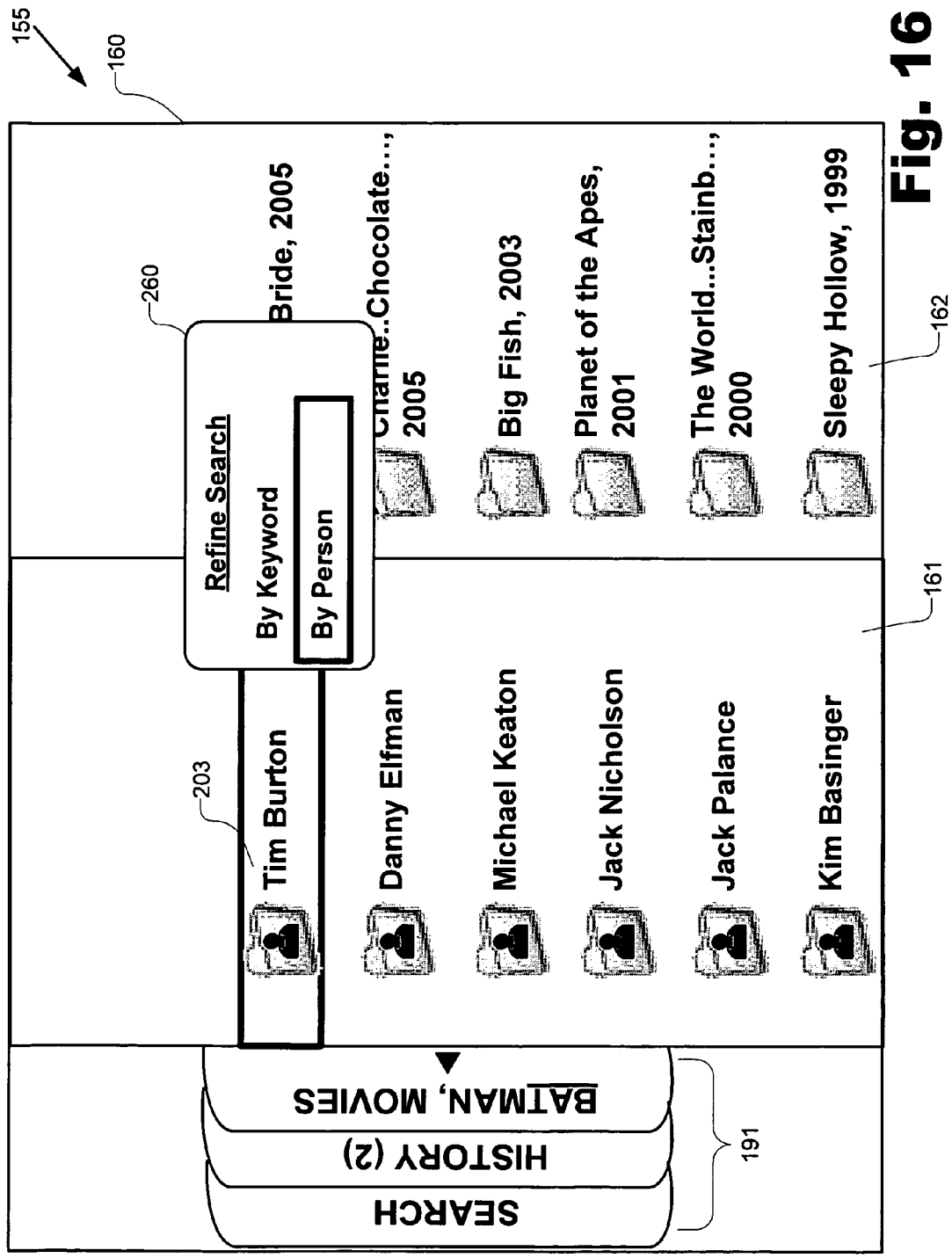
FIG. 16 shows another exemplary view of the search GUI, according to an embodiment.

In some examples, the search GUI 160 may be used to search for relationships between people associated one or more media content instances. To illustrate, once the user has selected the Tim Burton folder 203, the user may invoke an option to refine the search "by person". FIG. 16 shows the search GUI 160 with a graphic 260 presenting to the user an option to refine the search by person. Upon selecting the search by person option, the character entry field 163 may be displayed in the search GUI 160, as shown in FIG. 17.

The user may then enter the name of another person to search for a relationship between that person and Tim Burton. For example, if the user enters "DEPP" into the character entry field 163, a list 270 of media content instances may be displayed in the second viewing pane 162 that are associated with both Tim Burton and a person named "Depp" (e.g., Johnny Depp).

III. Exemplary Process View

FIG. 18 illustrates an exemplary method of providing a capability of searching and/or browsing through media content that may be available via the processing subsystem 110, according to an embodiment. While FIG. 18 illustrates exemplary steps according to one embodiment, other embodiments may omit, add to, reorder, and/or modify any of the steps shown in FIG. 18.

In step 280, a search GUI 160 having at least a first viewing pane 161 and a second viewing pane 162 is displayed on the viewing screen 155 of a display device 112. The search GUI 160 may be generated using any suitable application within the processing subsystem 110 as described previously.

A sequence of characters may then be entered into a character entry field 163 located within the first viewing pane 161, as shown in step 281. The sequence of characters may be entered by a user who desires to search for that particular sequence of characters within media content that is available via a particular processing subsystem 110.

In steps 282 and 283, a search results list based on the sequence of characters that is input into the character entry field 163 is then generated and displayed within the second viewing pane 162. In some examples, the search results list is dynamically updated in real-time as each character is input into the character entry field 163.

A user may then select one of the entries within the search results list, as shown in step 284. If an entry is selected (Yes; step 284), the display of the search results list is transferred to the first viewing pane 161 and information corresponding to the selected entry is displayed within the second viewing pane 162, as shown in steps 285 and 286, respectively. The information corresponding to the selected entry may include, but is not limited to, another search results list, a list of media content instances, program information corresponding to the selected entry, and/or any other information related to the selected entry as may serve a particular application.

IV. Alternative Embodiments

The preceding description has been presented only to illustrate and describe embodiments of the invention. It is not intended to be exhaustive or to limit the invention to any precise form disclosed. The invention may be practiced otherwise than is specifically explained and illustrated without departing from its spirit or scope. It is intended that the scope of the invention be defined by the following claims.

What is claimed is:

1. A system comprising:
    at least one computing device configured to
        display an interactive search graphical user interface having at least a first viewing pane and a second viewing pane;
        display a search results list within said second viewing pane, said search results list including a plurality of entries each related to a search term provided by a user and corresponding to one or more media content instances;
        transfer, in response to a selection by a user of an entry that is included within the plurality of entries and that is representative of a person related to the search term, said display of said search results list to said first viewing pane;
        display, subsequent to the search results list being displayed in the first viewing pane and in response to a selection by a user of an option to enter a name of an additional person, a character entry field; and
        display, within said second viewing pane in response to an entry of the name of the additional person into the character entry field by the user, a list of one or more media content instances related to both the person and the additional person and unrelated to the search term.

2. The system of claim 1, wherein said plurality of entries within said search results list comprise one or more folders containing related content, one or more titles of said one or more media content instances, and one or more names of people related to said one or more media content instances.

3. The system of claim 1, wherein said at least one computing device is further configured to dynamically display said list of one or more media content instances related to both the person and the additional person and unrelated to the search term as one or more characters representative of the name of the additional person are input into said character entry field.

4. The system of claim 3, wherein said at least one computing device is further configured to display an interactive keypad configured to facilitate said entry of said name of said additional person into said character entry field.

5. The system of claim 1, wherein said at least one computing device is further configured to display an interactive scrolling character wheel configured to facilitate said entry of said name of said additional person into said character entry field.

6. The system of claim 1, wherein said at least one computing device is further configured to display at least one selectable search history tab configured to graphically represent a number of corresponding search levels within a search thread taken by the user during a search session.

7. The system of claim 6, wherein said at least one selectable search history tab comprises a plurality of selectable search history tabs that are vertically aligned.

8. The system of claim 6, wherein said at least one search tab comprises an expandable search history tab that expands into a number of additional search history tabs when selected.

9. The system of claim 1, wherein said first and second viewing panes are vertically aligned.

10. The system of claim 1, wherein the at least one computing device is further configured to:
   display the character entry field within the first viewing pane; and
   display the list of the one or more media content instances related to both the person and the additional person within the second viewing pane while the character entry field is displayed within the first viewing pane.

11. An apparatus comprising:
   a graphics engine configured to generate one or more graphics that are displayed by a display device; and
   a processor communicatively coupled to said graphics engine, said processor configured cause said graphics engine to
      generate an interactive search graphical user interface that is displayed by said display device, said search graphical user interface having at least a first viewing pane and a second viewing pane;
      generate a search results list that is displayed within said second viewing pane, said search results list including a plurality of entries each related to a search term provided by a user and corresponding to one or more media content instances;
      transfer, in response to a selection by a user of an entry that is included within the plurality of entries and that is representative of a person related to the search term, said display of said search results list to said first viewing pane;
      display, subsequent to the search results list being displayed in the first viewing pane and in response to a selection by a user of an option to enter a name of an additional person, a character entry field; and
      display, within said second viewing pane in response to an entry of the name of the additional person into the character entry field by the user, a list of one or more media content instances related to both the person and the additional person and unrelated to the search term.

12. The apparatus of claim 11, wherein said plurality of entries within said search results list comprise one or more folders containing related content, one or more titles of said one or more media content instances, and one or more names of people related to said one or more media content instances.

13. The apparatus of claim 11, wherein said list of one or more media content instances related to both the person and the additional person and unrelated to the search term is dynamically displayed as one or more characters representative of the name of the additional person are input into said character entry field.

14. The apparatus of claim 11, wherein said processor is further configured to cause said graphics engine to generate and display an interactive scrolling character wheel configured to facilitate said entry of said name of said additional person into said character entry field.

15. The apparatus of claim 11, wherein said processor is further configured to cause said graphics engine to generate and display at least one selectable search history tab configured to graphically represent a corresponding search level within a search thread taken by the user during a search session.

16. The apparatus of claim 15, wherein said at least one selectable search history tab comprises a plurality of search history tabs that are vertically aligned.

17. The apparatus of claim 15, wherein said at least one selectable search history tab comprises a plurality of search history tabs and wherein at least one of said plurality of search history tabs comprises an expandable search history tab that expands into a number of additional search history tabs when selected.

18. The apparatus of claim 11, wherein said first and second viewing panes are vertically aligned.

19. The apparatus of claim 11, wherein the processor is further configured to cause the graphics engine to:
   display the character entry field within the first viewing pane; and
   display the list of the one or more media content instances related to both the person and the additional person within the second viewing pane while the character entry field is displayed within the first viewing pane.

20. A method comprising:
   displaying, by at least one computing device, an interactive search graphical user interface having at least a first viewing pane and a second viewing pane;
   displaying, by the at least one computing device, a search results list within said second viewing pane, said search results list including a plurality of entries each related to a search term provided by a user and corresponding to one or more media content instances;
   transferring, by the at least one computing device in response to a selection by a user of an entry that is included within the plurality of entries and that is representative of a person related to the search term, said display of said search results list to said first viewing pane;
   displaying, by the at least one computing device subsequent to the search results list being displayed in the first viewing pane and in response to a selection by a user of an option to enter a name of an additional person, a character entry field; and
   displaying, by the at least one computing device within said second viewing pane in response to an entry of the name of the additional person into the character entry field by the user, a list of one or more media content instances related to both the person and the additional person and unrelated to the search term.

21. The method of claim 20, wherein said plurality of entries within said search results list comprise one or more folders containing related content, one or more titles of said one or more media content instances, and one or more names of people related to said one or more media content instances.

22. The method of claim 20, further comprising dynamically displaying, by the at least one computing device, said list of one or more media content instances related to both the person and the additional person and unrelated to the search term as one or more characters representative of the name of the additional person are input into said character entry field.

23. The method of claim 20, further comprising displaying, by the at least one computing device, at least one selectable search history tab configured to graphically represent a number of corresponding search levels within a search thread taken by the user during a search session.

24. The method of claim 21, wherein:
   the displaying of the character entry field comprises displaying the character entry field within the first viewing pane; and
   the displaying of the list of the one or more media content instances related to both the person and the additional person comprises displaying the list of the one or more media content instances related to both the person and the additional person within the second viewing pane while the character entry field is displayed within the first viewing pane.

* * * * *